United States Patent [19]

Ackley et al.

[11] 4,243,984

[45] Jan. 6, 1981

[54] VIDEO DISPLAY PROCESSOR

[75] Inventors: David A. Ackley, Stafford; Gerald D. Rogers, Sugarland; Peter H. Macourek, Needville; Karl M. Guttag; Ki Suk Chang, both of Houston, all of Tex.

[73] Assignee: Texas Instruments Incorporated, Dallas, Tex.

[21] Appl. No.: 18,540

[22] Filed: Mar. 8, 1979

[51] Int. Cl.[3] .............................................. G06F 3/153

[52] U.S. Cl. .................................... 340/703; 340/725; 340/747; 340/799

[58] Field of Search ................ 340/703, 725, 747, 799

[56] References Cited

U.S. PATENT DOCUMENTS

| | | | |
|---|---|---|---|
| 3,891,792 | 6/1975 | Kimura . | |
| 3,918,039 | 11/1975 | Clark . | |
| 3,944,997 | 3/1976 | Swallow | 340/703 X |
| 3,955,189 | 5/1976 | Thomson | 340/799 X |
| 4,034,990 | 7/1977 | Baer . | |
| 4,081,797 | 3/1978 | Olson . | |
| 4,107,664 | 8/1978 | Marino . | |
| 4,107,665 | 8/1978 | Mayer et al. . | |
| 4,116,444 | 9/1978 | Mayer et al. | 340/747 X |
| 4,119,955 | 10/1978 | Nichols . | |
| 4,127,849 | 11/1978 | Okor | 340/703 |
| 4,129,858 | 12/1978 | Hara . | |
| 4,155,095 | 5/1979 | Kirschner | 340/703 X |
| 4,156,237 | 5/1979 | Okada et al. | 340/799 X |

*Primary Examiner*—David L. Trafton
*Attorney, Agent, or Firm*—Andrew J. Dillon; Stephen S. Sadacca; Melvin Sharp

[57] ABSTRACT

A digital computing system is disclosed having a monolithic microprocessor, a versatile input/output subsystem, a multi-medium memory subsystem, and a video display subsystem with audio generating capability. In the memory subsystem, a balanced mix of dynamic RAM, P-channel MOS ROM and N-channel MOS ROM are included to minimize cost without sacrificing performance. In the video display subsystem, a monolithic video display processor performs all RAM access functions, in addition to composite video generation. The resultant composite video signal, which may include audio and external video information, can be applied directly to a video monitor or RF modulated for use by a television receiver.

8 Claims, 14 Drawing Figures

VIDEO DISPLAY PROCESSOR

CROSS REFERENCE TO RELATED APPLICATIONS

The subject matter disclosed herein is related to the subject matter disclosed in the co-pending U.S. patent application Ser. No. 17,865 filed Mar. 5, 1979 entitled "Video Display Processor Having an Integral Composite Video Generator," filed by the inventor thereof, Joe F. Sexton, and assigned to the assignee of the present invention.

BACKGROUND OF THE INVENTION

1. Field of the Invention

This invention relates generally to composite video signal generating devices and, more particularly, but not by way of limitation, to a monolithic video display processor which can superimpose one or more mobile patterns at selected locations on a larger, fixed pattern image.

2. Prior Art Statement.

Although numerous systems have been proposed for digitally generating composite video signals containing desired display patterns, such systems have been generally confined to relatively fixed pattern images. Examples of such systems are shown in U.S. Pat. Nos. 4,107,664 and 4,129,858. In contrast, some systems have been proposed to provide relatively fixed pattern images, but with one or more mobile patterns which may be displayed at selected displacements relative to the fixed pattern image. In the latter type systems, however, the display capabilities are generally constrained by the limited size of a dedicated memory area, as in U.S. Pat. No. 4,119,955, or by the limited time period reserved for processing the mobile patterns, as in U.S. Pat. No. 4,116,444. Other systems of general interest are shown in U.S. Pat. Nos. 3,345,458; 3,891,791; 3,918,039; 4,034,990; 4,081,797; and 4,107,665.

SUMMARY OF THE INVENTION

In a video display system for use with a raster-scanned video display unit, a video display processor for providing a composite video signal for application to the video display unit, whereby a first video image may be displayed with a second video image superimposed thereon at a predetermined column and row displacement. More particularly, the video display processor comprises a sequence control which provides a cyclic column and row count indicative of the time sequential position of the raster-scan; a memory control for selectively retrieving from a random access memory provided in the system, portions of a first, second and third arrays containing digital representations of the first and second video images and the relative displacement thereof, respectively; an overlay control which provides a first pattern signal indicative of the digital representation of the first video image and a second pattern signal representative of the second video image; a priority selector for selecting the first pattern signal unless the second pattern signal is provided; and a composite video generator for generating said composite video signal in accordance with the selected pattern signal. In a preferred form, the overlay control determines during each horizontal trace interval whether the second video image is to be displayed during the next horizontal trace interval, retrieves the pattern information from the second array during the intervening horizontal retrace interval, and sequentially provides the pattern information at an appropriate column displacement during the next horizontal trace interval.

It is an object of the present invention to provide a video display processor for providing a composite video signal for application to a video display unit in a video display system.

Another object of the present invention is to provide a video display processor for displaying a first video image on a video display unit with a second video image superimposed thereon at a predetermined column and row displacement.

Yet another object of the present invention is to provide a video display processor for providing a complete composite video signal from processing information stored in a random access memory, without preempting access to the random access memory during significant portions of the active display period of the raster-scan.

Still another object of the present invention is to provide a video display processor for providing a composite video signal for application to a video display unit, whereby a first video image may be displayed with a plurality of second video images superimposed thereon at predetermined column and row displacements, particularly when portions of said second video images are selected to be transparent.

Other objects and advantages of the present invention will be apparent from the following detailed specification, when read in conjunction with the accompanying drawings which illustrate the preferred embodiment of the invention.

GENERAL SYSTEM DESCRIPTION

Figure 1:
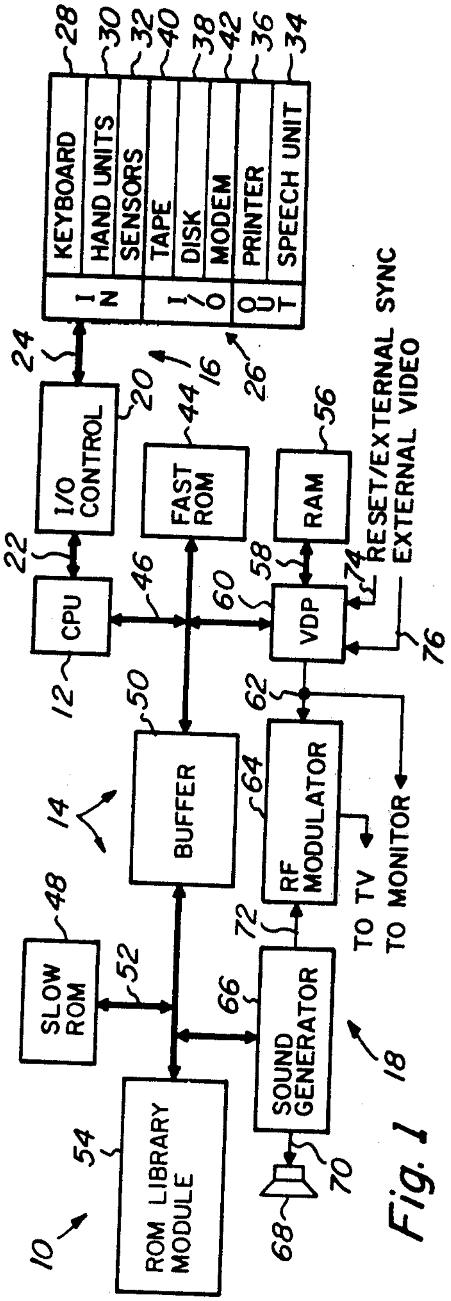
FIG. 1 is a schematic representation of a digital computing system incorporating the preferred embodiment of the present invention.

Shown in FIG. 1 is a digital computing system 10 incorporating the preferred embodiment of the present invention. In general, the digital computing system 10 is comprised of a central processing unit (CPU) 12, a memory subsystem 14, an input/output subsystem 16, and a video display subsystem 18. The CPU 12, which may be a monolithic microprocessor such as the Texas Instruments 9985, operates in a conventionaL manner under the control of digital control programs stored in the memory subsystems 14, usually in response to processing requests initiated via the input/output subsystem 16. In the input/output subsystem 16, an I/O control unit 20, which may be a monolithic integrated circuit such as the Texas Instruments 9901, operates in a conventional manner to interface a CPU communication bus 22 to an I/O bus 24 connected to one or more I/O unites 20. By way of example, the I/O units 26, may be such conventional devices as the following: input devices, including a keyboard 28, a plurality of handheld units 30, and various types of remote sensors 32; output devices, such as speech synthesizer unit 34 and a hard copy printer 36; and bidirectional input and output devices such as a magnetic disk unit 38, a magnetic tape unit 40, and a communication modem 42.

In the memory subsystem 14, it is frequently desirable to combine a quantity of read only memory (ROM) with a quantity of read/write, random access memory (RAM). In such configuration, support programs, such as a suitable operating system and a desired assembler or complier, are stored in the ROM, while user programs and volatile data are stored in the RAM. In this form, the relatively static programs and data are maintained in the relatively less expensive ROM, so that only the relatively transient programs and data need be stored in the generally more expensive RAM.

In the preferred form shown in FIG. 1, the memory subsystem 14 is also configured to take advantage of the low cost of relatively slow ROM and of dynamic RAM, without substantially degrading the performance of the CPU 12. More particularly, in the ROM portion of the memory subsystem 14, a relatively limited amount of fast ROM 44, preferably of the N-channel MOS type, such as the Texas Instruments 4732, is directly connected to the CPU 12 via a CPU memory bust 46, while a larger amount of relatively slow ROM 48, preferably of the P-channel MOS type, such as the Texas Instruments 0430, is connected to the CPU via a bus buffer 50, such as the Texas Instruments 74LS245, interposed between the CPU memory bus 46 and an auxiliary bus 52. By providing each device comprising the slow ROM 48 with an internal auto-incrementing address counter, the CPU overhead associated with sequentially accessing the slow ROM 48 is greatly reduced. If, in addition, each of the devices comprising the slow ROM 48 is assigned a unique ROM address page number, as in the 0430, an additional plurality of such devices may be incorporated to form a ROM library module 54 for connection to the auxiliary bus 52 via a suitable plug-in type port.

In the RAM portion of the memory subsystem 14, a block of dynamic RAM 56, preferably of the N-channel MOS type, such as the Texas Instruments 4027, is connected via a RAM bus 58 to the CPU memory bus 46 via a video display processor (VDP) 60. More particularly, the VDP 60 is constructed to provide, in addition to other functions to be described below, an auto-incrementing address counter capability, similar to that incorporated in the devices comprising the slow ROM 48. In addition, the VDP 60 provides for the periodic refreshing of the contents of the various devices comprising the RAM 56. Thus, the CPU 12 is relieved of the burden of supplying addresses for each of a series of sequential accesses to the RAM 56, and of the considerable overhead normally associated with the periodic refreshing of dynamic random access memory.

In the video display subsystem 18, the VDP 60 may be activated by the CPU 12 via the CPU memory bus 46 to generate all video, control and synchronization signals necessary for the display on a raster-scanned television unit of a set of display data previously generated by the CPU 12 and stored in the RAM 56. The resultant composite video signal is provided via a signal path 62 for application either to a dedicated monitor unit or to a conventional RF modulator 64 before application to a conventional television receiver. In the preferred form, a sound generator 66, such as the Texas instruments 9919, is connected to the CPU 12 via the auxiliary bus 52 and provides a CPU-controlled audio signal which may be applied to an auxiliary speaker 68 via a signal path 70 or to the RF modulator 64 via a signal path 72 for mixing with the composite video signal provided by the VDP 60.

To facilitate system initialization and synchronization, it is preferred that the VDP 60 respond to a manual reset or an external synchronization signal on a signal path 74, by placing the various control portions thereof in a known state. Similarly, it is considered desirable that the VDP 60 be capable of receiving an externally produced, composite video signal via a signal path 76, and mixing the external video signal with the internally-generated composite video signal for output via the signal path 62. For example, it may be desirable in some circumstances to combine the composite video signal generated by the VDP 60 with a composite video signal produced via an auxiliary television camera or derived from a broadcast television signal. In such a configuration, the VDP may be conveniently synchronized with the external video source by extracting in a conventional manner appropriate synchronizing portions of the external video signal on the signal path 76 for application to the VDP 60 via the signal path 74. As will be readily apparent to those skilled in the art, the external video input and synchronization capability of the VDP 60 also facilitates the chaining of two or more VDP 60 devices, to greatly enhance the data display and animation capabilities of the digital computing system 10.

GENERAL DESCRIPTION OF THE VIDEO DISPLAY PROCESSOR

Figure 2:
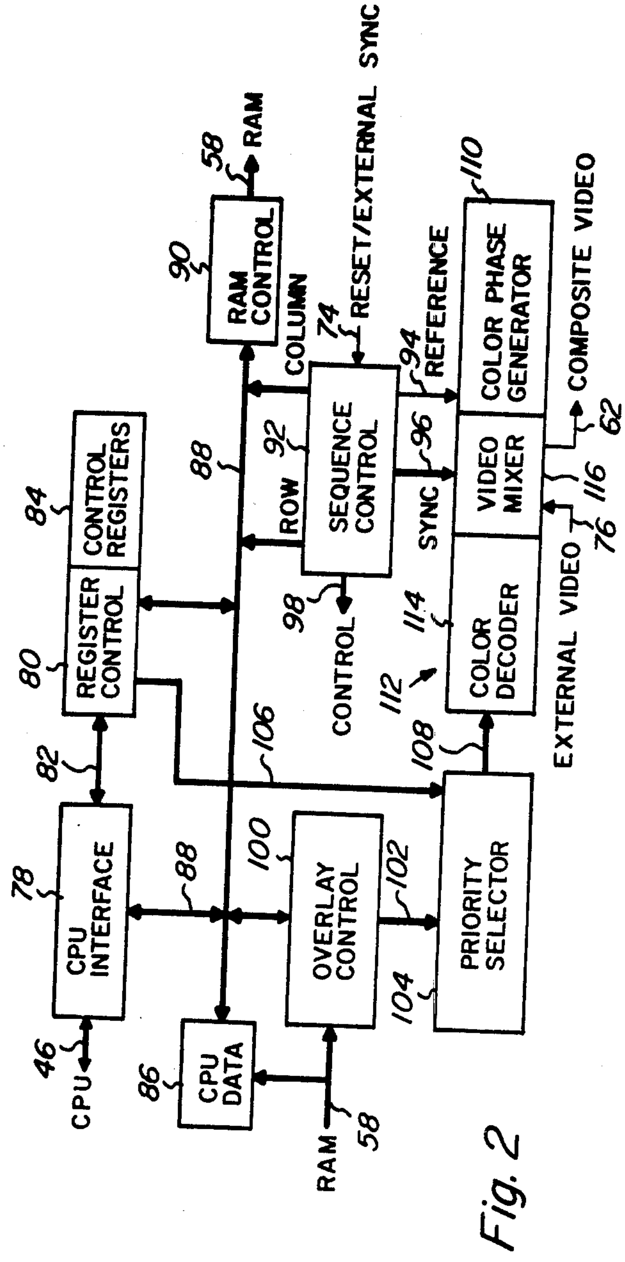
FIG. 2 is a block diagram of the video display processor shown in FIG. 1.

Shown in FIG. 2 is a block diagram of the circuit comprising the video display processor 60 shown in FIG. 1. In general, the VDP 60 is constructed to operate in both a RAM controller mode and in a video controller mode, with substantial simultaneity occuring between these modes. In addition, much of the circuitry for accomplishing the RAM controller functions may be conveniently employed, together with additional circuitry, for accomplishing the video controller functions. In this manner, substantial savings in time and circuitry are realized.

In general, a CPU interface 78 response to access requests from the CPU 12 via the CPU memory bus 46.

When a CPU access request is initially received, the CPU interface 78 transfers the selected RAM address to a register control 80 via a register bus 82 for storage in a particular one of a set of control registers 84. In the case of a write request, the CPU interface 78 then latches the write data from the CPU memory bus 46 into a CPU data register 86 via a VDP address and data bus 80, and initiates a CPU write access request for service by a RAM control 90. In response to the write request, the RAM control 90 will retrieve the RAM address from the control registers 84 via the register control 80, and pass the RAM address to the RAM 56 via the RAM bus 58. Thereafter, the RAM control 90 will transfer the write data from the CPU data register 86 to the ram 56 via the RAM bus 58. In the case of a read request, the CPU interface 78 will simply initiate a CPU read access request for service by the RAM control 90. As in the case of a write request, the RAM control 90 then transfers the RAM address from the control registers 84 to the RAM 56. Thereafter, the RAM control 90 cooperates with the RAM 56 to latch the read data provided by the RAM 56 via the RAM bus 58 into the CPU data register 86. When the CPU 12 calls for the data, the CPU interface 78 transfers the read data provided by the CPU data register 86 on the VDP address and data bus 88 to the CPU 12 via the CPU memory bus 46.

As soon as a write request has been serviced, the RAM control 90 will automatically increment the RAM address contained in the control registers 84, so that a subsequent CPU write access request can be made into the next sequential address location in the RAM 56 merely by transferring the write data from the CPU 12 into the CPU data register 86 via the CPU interface 78. Similarly, the RAM control 90 will automatically increment the RAM address contained in the control registers 84 after a read request has been serviced, so that a subsequent CPU read access request can be made from the next sequential address location in the RAM 56 as soon as the CPU interface 78 has completed the transfer of the preceeding read data to the CPU 12. Thus, the CPU 12 spends a minimum amount of time waiting for a data transfer after an access request is issued.

When VDP register access request is received, the CPU interface 78 transfers the address of the particular one of the set of control registers 84 to the register control 82 via the register bus 82. In the case of a register write request, the CPU interface 78 transfers the write data from the CPU memory bus 46 to the register bus 82, for subsequent latching into the selected control register 84 via the register control 80. In the case of a register read request, the register control 80 connects the selected control register 84 to the register bus 82, with the CPU interface 78 subsequently connecting the register bus 82 to the CPU memory bus 46.

When the VDP 60 is operating in the RAM controller mode only, the RAM control 90 operates in a conventional manner to periodically access each of the refresh segments in the RAM 56. Thus, RAM contents are protected in the event that the CPU 12 fails to exercise each of the refresh segments through normal RAM accesses.

In the video controller mode, the VDP 60 generates a composite video signal in accordance with a set of control parameters established in the control registers 84, using a set of display data arrays stored in the RAM 56. In general, the composite video signal, when displayed on a suitable video display unit, produces a video display image comprised of M columns of N rows of individual, discrete video display elements of pixels. For convenience of information display, however, the (M×N) pixels may be considered as being logically associated into smaller contiguous groups or blocks which may be configured or defined to form discernible characters or "patterns," as in conventional character generators. In addition, however, the preferred form of the VDP 60 accomodates a plurality of mobile blocks or "sprites" which may be freely moved relative to the fixed display image by defining or selecting a particular column U all row V at which the upper left corner of the sprite is to be displayed. Thus, VDP 60 generates the composite video signal in synchronization with the instantaneous column X and row Y position of the faster scan so as to diplay either the fixed patterns or the mobile sprites, as appropriate.

In the preferred form, the VDP 60 operates in a CPU-selected one of three distinct video display modes: pattern graphics, multicolor, and text. Briefly, in the pattern graphics mode, the VDP 60 generates a 32 column, 24 row image of patterns (8×8 pixels) selected from a pattern generator table (256 pattern definition blocks) according to a pattern name table (768 pattern names), and, in addition, superimposes up to 32 of the mobile patterns or sprites (8×8 pixels) selected from a sprite generator table (256 sprite definition blocks) according to a sprite name table (32 sprite descriptor blocks) which also defines the displacement of each sprite relative to the pattern image. In the multicolor mode, the VDP 60 generates a 32 column, 6 row image of color patterns (2×8 blocks of 4×4 pixels each) selected from a pattern color table (1536 elements) according to a pattern name table (192 pattern names), with up to 32 of the sprites being generated in substantially the same manner as in the pattern graphics mode. In the text mode, the VDP 60 generates a 40 column, 24 row image of patterns (6×8 pixels) selected from a pattern generator table (256 pattern definition blocks) according to a pattern name table (960 pattern names). In each of the three video display modes, the VDP 60 provides a selection of 16 distinct colors, including white, gray, black and a special transparent state to be described in greater detail below. Since the operation of the VDP 60 in the multicolor and text modes is substantially the same as in the pattern graphics mode, except for the differences noted above, the discussion hereinafter will be directed primarily to the detailed operation in the pattern graphics mode.

During system initialization and as required thereafter, the VDP 60, operating in the memory controller mode, cooperates with the CPU 12 to establish in the RAM 56 the various display data arrays appropriate for a selected one of the three video display modes. For example, to enable the VDP 60 to operate in the pattern graphics mode, the CPU 12 should store in the RAM 56 the various pattern and sprite tables relied upon by the VDP 60. In particular, the patter generator table is comprised plurality of consecutive pattern definition blocks, each consisting of 8, 8-bit bytes, which define the bit patterns for each individual pattern, as in conventional character generators. In contrast, the pattern name table consists of a row-by-column ordered array of patterned names which map the pattern definition blocks into each of the 32 columns of 24 rows of patterns comprising a full screen video pattern image. In addition, a pattern color table establishes a pair of video color codes associated with each of 32 contiguous sets of 8 patterns definition blocks of the pattern generator table, with each of the video color codes corresponding to a particular one of the sixteen available colors. Thus, the pattern name table, the pattern generator table and the pattern color table represent an ordered array whereby the individual bits comprising a pattern definition block map the video color codes assigned via the pattern color table into each of the M column of N rows of pixels comprising a full screen video pattern image. In a similar manner, the sprite generator table is comprised of a plurality of consecutive sprite definition blocks, each consisting of 3, 8-bit bytes, which define particular bit patterns for each of the patterns to be utilized as sprites. The sprite name table, on the other hand, is comprised of 32, 4-byte sprite descriptor blocks which define the particular column displacement U and row displacement V for the display of the particular sprite relative to the video pattern image, where $1 \leqq U \leqq M$ and $1 \leqq V \leqq N$. In addition, each of the sprite descriptor blocks in the sprite name table contains a sprite name which refers to a particular one of the sprite definition blocks in the sprite generator table, as well as a video color code which establishes the particular one of the sixteen available colors that the active portion of the sprite is to assume. Thus, the sprite name table and the sprite generator table represent an ordered array whereby the individual bits comprising a sprite definition block map the video color code assigned via the sprite descriptor block into the S columns of T rows of pixels comprising a particular video sprite image, where $1 \leqq S \leqq M$ and $1 \leqq T \leqq N$. To promote uniformity of reference, the dimensions of the pattern and sprite image as well as the displacement of the sprite imate relative to the pattern image are considered herein in terms of individual pixels, since the format of the various tables in the RAM 56 are generally related to the particular number of rows and columns of discrete symbols or characters characteristic of the selected video display mode.

In general, a sequence control 92 operates in a conventional manner to maintain a cyclic column count X and a cyclic row count Y indicative of the time sequential position of the raster scan of the video display unit. As will be clear to those skilled in the art, only a portion of the total raster scan period is devoted to actively displaying patterns on the video display unit, since a portion of each row of horizontal scan is devoted to horizontal retrace, while a number of complete row or horizontal scans are required to perform vertical retrace and related synchronization. However, at least during the active display period, the sequence control 92 makes the column count X and the row count Y available via the VDP address and data bus 88. The sequence control 92 also provides a color reference signal having a frequency related to the NTSC 3.5/MHZ carrier, via a signal path 94, and a set of sync signals of substantially conventional form via a sync bus 96. In response to the reset/external sync signal on the signal path 74, the sequence control 92 clears the column and row counts, and generally synchorizes the color reference signal and the sync signals with the external source. In the preferred form, the sequence control 92 is comprised of a clock circuit of conventional form, and a pair of control programmable logic arrays (PLA's) for providing a various control signals via a control bus 98 depending on the current column and row counts.

An overlay control 100, responsive to the column and row counts, periodically requests the RAM control 90 to retrieve selected portions of the pattern and sprite tables from the RAM 56. As the displays data is provided by the RAM 56 via the RAM bus 58, the overlay control 100 receives the pattern data, and provides a first pattern signal via a pattern bus 102, comprising the bit in the pattern generator table which maps the pixel in the column X of the row Y of the video sprite image when $1 \leqq X \leqq M$ and $1 \leqq Y \leqq N$. The overlay control 100 also receives the sprite data, and provides a second pattern signal via the pattern bus 102, comprising the bit in the sprite generator table which maps the pixel in the column $(X-U+1)$ of the row $(Y-V+1)$ of the video sprite image when $U \leqq X<(U+S)$ and $V \leqq Y<(V+T)$. In addition, the overlay control 100 receives the video color codes assigned to each pattern and sprite during the display thereof. In other words, the overlay control 100 processes the pattern data arrays so as to provide the proper bit patterns for each of the selected patterns during the entire period that the display is active, but processes the sprite data arrays so as to provide the proper bit patterns for each of the selected sprites only during that portion of the active display period specified for the display thereof.

Each of the first and second pattern signals, and the associated video color codes, are applied to a priority selector 104 via the pattern bus 102. In response to receiving only the first pattern signal, the priority selector 104 will select a respective one of the video color codes associated with the first pattern signal, depending upon the current digital value thereof. On the other hand, in response to receiving the second pattern signal, whether or not the first pattern signal is also being received, the priority selector 104 will select the video color code associated with the second pattern signal. If neither the first nor second pattern signals is being received, the priority selector 104 will generally select a default video color code provided by one of the control registers 84 via a default color bus 106. If, as in the preferred form, the overlay control 100 provides a second pattern signal for each of a plurality of active sprites, the priority selector 104 will select the second pattern signal corresponding to the sprite image having the highest priority, according to a predetermined prioritized ordering of the available sprite images. For example, assuming that the overlay control 100 can simultaneously provide a second pattern signal for each of four different sprites representing four out of the priority ordered set of 32 sprites, the priority selector 104 will select the second pattern signal which corresponds to the one of the four sprites having the highest priority. In each case, the video color code corresponding to the current selected pattern signal is provided via a color bus 108 as a video control signal.

A color phase generator 110, which forms a portion of a composite video generator 112, receives the color reference signal provided by the sequence control 92 via signal path 94, and generates the six NTSC color phase signals, each phase shifted by a predetermined amount relative to the color reference signal. In a color decoder 114, the video color codes, comprising the video control signal provided by priority selector 104 via the color bus 108, are decoded, and applied to a video mixer 116, together with the color phase signals provided by the color phase generator 110. In the video mixer 116, each of the video color codes decoded via the color decoder 114 selectively couples a complimentary pair of the color phase signals to a gating network (described hereinafter) to generate the information portion of a composite video signal for output via the signal path 62. In addition, the video mixer 116 receives the sync signals provided by the sequence control 92 via the sync bus 96, and generates the standard horizontal, vertical and color burst portions of the composite video signal in response thereto. In the preferred form, the video mixer 116 may be placed in an external video mode wherein an external video signal received via the signal path 76 is selectively merged with the internally-generated composite video signal for output via the signal path 62.

DESCRIPTION OF THE OVERLAY CONTROL

Figure 3:
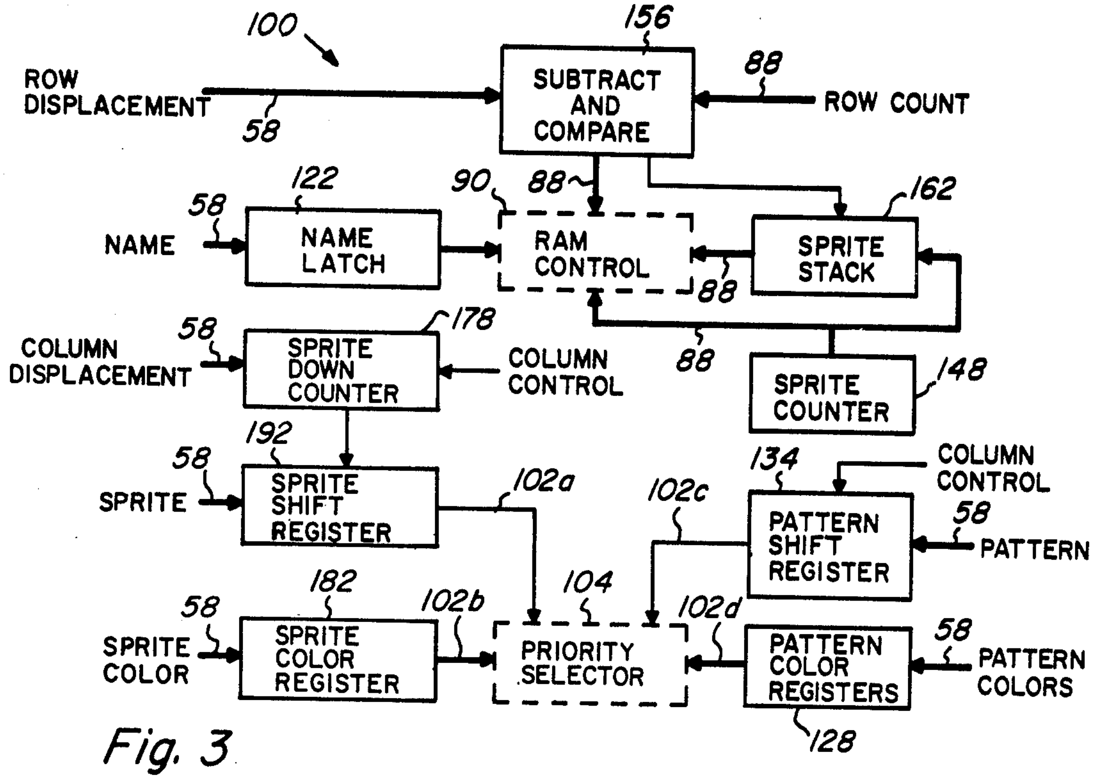
FIG. 3 is a block diagram generally illustrating the operation of the overlay control portion of the video display processor.
Figure 4:
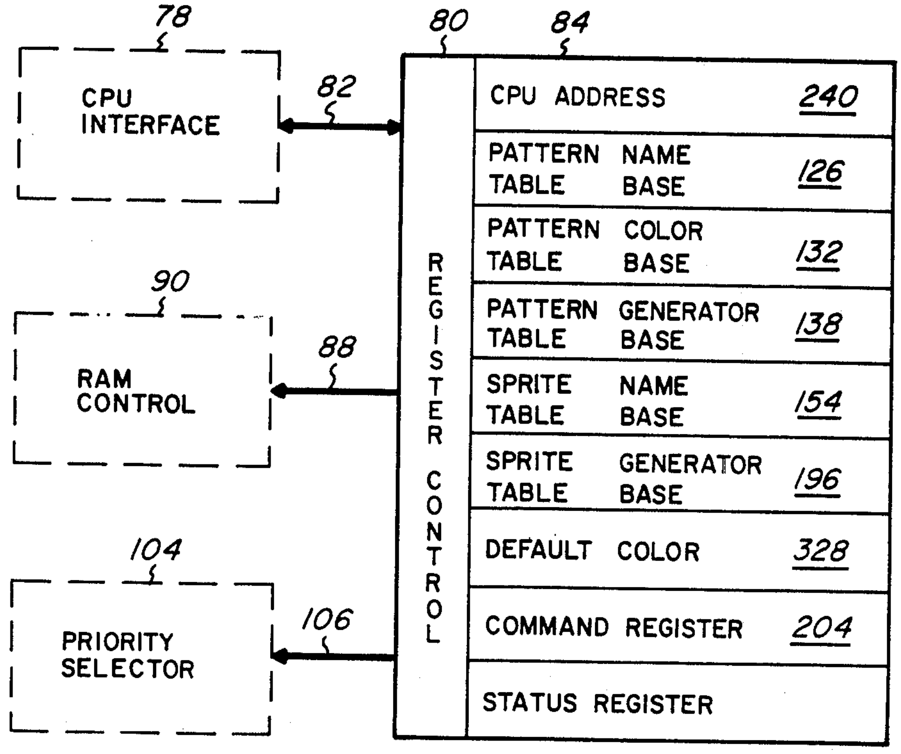
FIG. 4 is a schematic representation of the register control and control register portions of the video display processor.
Figure 5:
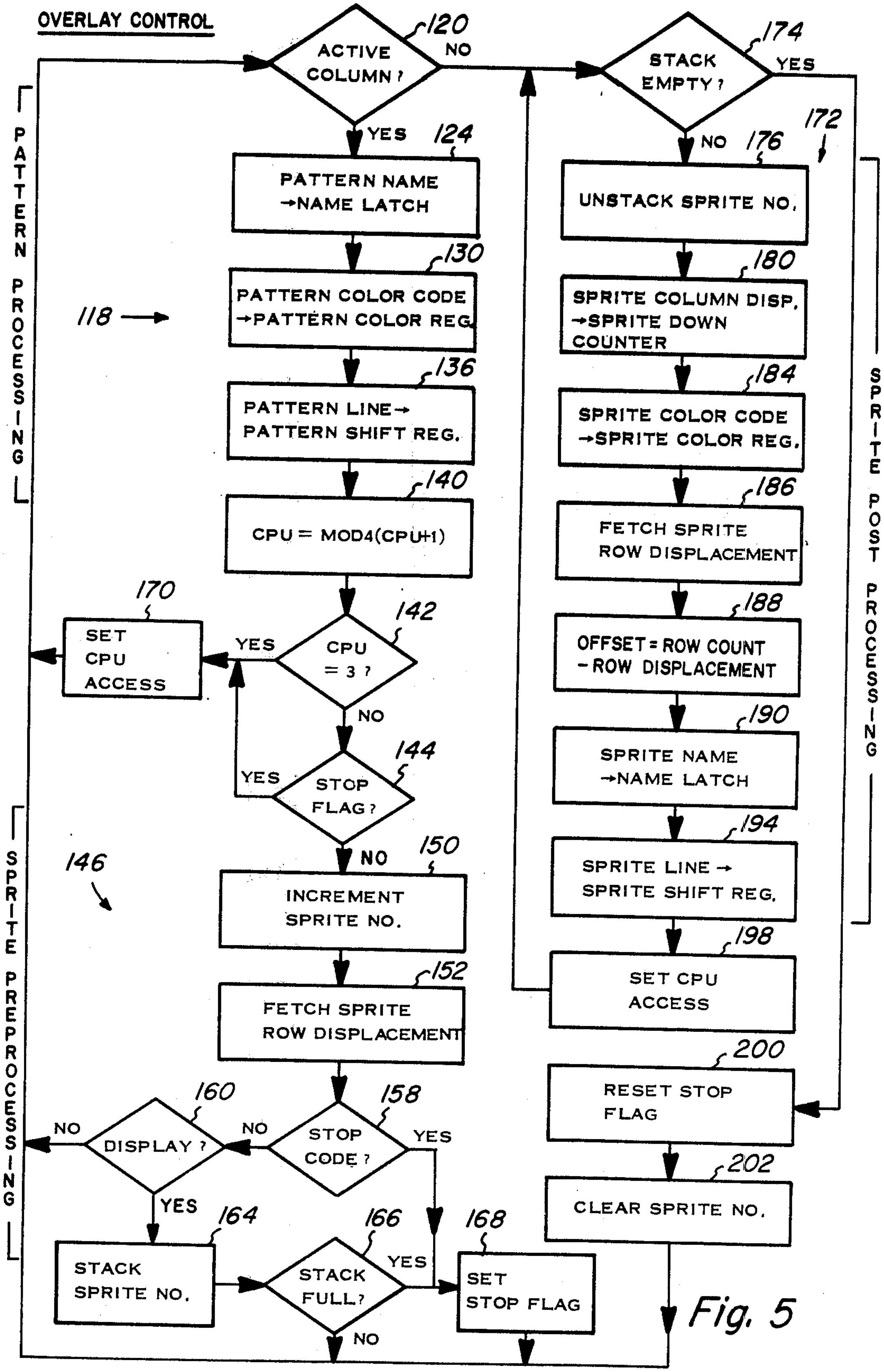
FIG. 5 is a logic diagram generally depicting, in conjunction with FIG. 3, the operation of the overlay control portion of the video display processor.

Shown in FIG. 3 is a block diagram generally illustrating the operation of the overlay control 100 (FIG. 2), generally in accordance with the logic diagram shown in FIG. 5, using the information stored by the CPU 12 in the control registers 84 shown in FIG. 4. More particularly, the overlay control 100 is generally responsive to the column and row counts provided by the sequence control 92. Thus, if the column count X and the row count Y indicated that the raster scan is positioned at the start of one of the horizontal rows in the active display range, the overlay control 100 will enter a pattern processing procedure 118 (decision block 120) and request the RAM control 90 to load the pattern name associated with the current column and row counts from the pattern name table into the name latch 122 (processing block 124). In response to this VDP access request, the RAM control 90 concatenates a pattern name table base address stored in a pattern name table base register 126 (FIG. 4), the current row count Y, and the current column count X to derive a RAM address for output to the RAM 56. For example, in the pattern graphics mode, the upper five bits of the row count Y and the upper five bits of the column count X provide access to each of the 788 pattern names.

After the pattern name is latched into the name latch 122, the overlay control 100 will request the RAM control 90 to load a pair of the video color codes from the pattern color table into a pair of pattern color registers 128 (processing block 130). In response to this VDP access request, the RAM control 90 concatenates a pattern color table base address stored in a pattern color table base register 132 (FIG. 4), with a suitable high-order portion of the pattern name to derive a RAM address for output to the RAM 56. For example, in the preferred form, the upper five bits of the pattern name provide access to a respective one of 32 pairs of video color codes for each consecutive set of eight pattern names in the pattern name table. In the preferred form, one of the video color codes assigned to a particular pattern defines the color of the foreground or information portion of the pattern image, while the other one of the video color codes defines the color of the background or constant portion of the pattern image.

After the pattern video color codes are loaded into the pattern color registers 128, the overlay control 100 will request the RAM control 90 to load a particular one of the eight bytes or pattern lines from the pattern generator table into a pattern shift register 134 (processing block 136). In response to this VDP access request, the RAM control 90 concentrates a pattern generator table base address stored in a pattern generator table base register 138 (FIG. 4), the pattern name stored in the name latch 122, and a suitable low-order portion of the current row count Y, to derive a RAM address for output to the RAM 56. For example, in the preferred form, the lower three bits of the row count Y provide access to a particular one of the eight bit pattern bytes comprising the pattern definition block selected via the pattern name.

After loading, the pattern shift register 134 will successively provide each consecutive bit of the pattern line in response to a column control signal applied thereto via the signal path 98*a* by the sequence control 92 in synchronization with the columnar movement of the raster scan within the active display range. Thus, the second pattern signal on the signal path 102*a* will comprise a time-sequential, digital representation of the full screen, pattern image as the raster scan is traversing the active display range.

After the pattern line is loaded into the pattern shift register 134, the overlay control 100 will increment, modulo 4, an internal CPU access index (processing block 140). If the resultant value of the CPU access index is not equal to 3 (decision block 142), and if a stop flag has not been set (decision block 144) in the manner described hereinafter, the overlay control 100 will enter a sprite preprocessing procedure 146 and increment a current sprite number maintained in a spriter counter 148 (processing block 150). Thereafter, the overlay control 100 will request the RAM control 90 to fetch the row displacement V for the current sprite number from the sprite name table (processing block 152). In response to this VDP access request, the RAM control 90 concatenates a sprite name table base address stored in a sprite name table base register 154 (FIG. 4), the current sprite number, and an attribute number indicative of the particular byte in the sprite descriptor block which defines the row displacement V, to derive a RAM address for output to the RAM 56. For example, in the preferred form, the row displacement V is contained in the first byte of the sprite descriptor block for each of the sprites defined in the sprite name table.

In a subtract and compare 156, the overlay control 100 compares the retrieved row displacement V against a predetermined stop code (decision block 158) which, if present, indicates that all subsequent entries in the sprite name table are to be ignored or otherwise not processed. Although substantially any value outside the active row count range may be employed, the preferred embodiment utilizes the stop code value 208, which is outside the active display range of 0–192 but within the total row count range of 0–255. Thus, a substantial number of RAM access cycles may be made available for use by the CPU 12 when it is desired to utilize less than the 32 available sprites.

Figure 6:
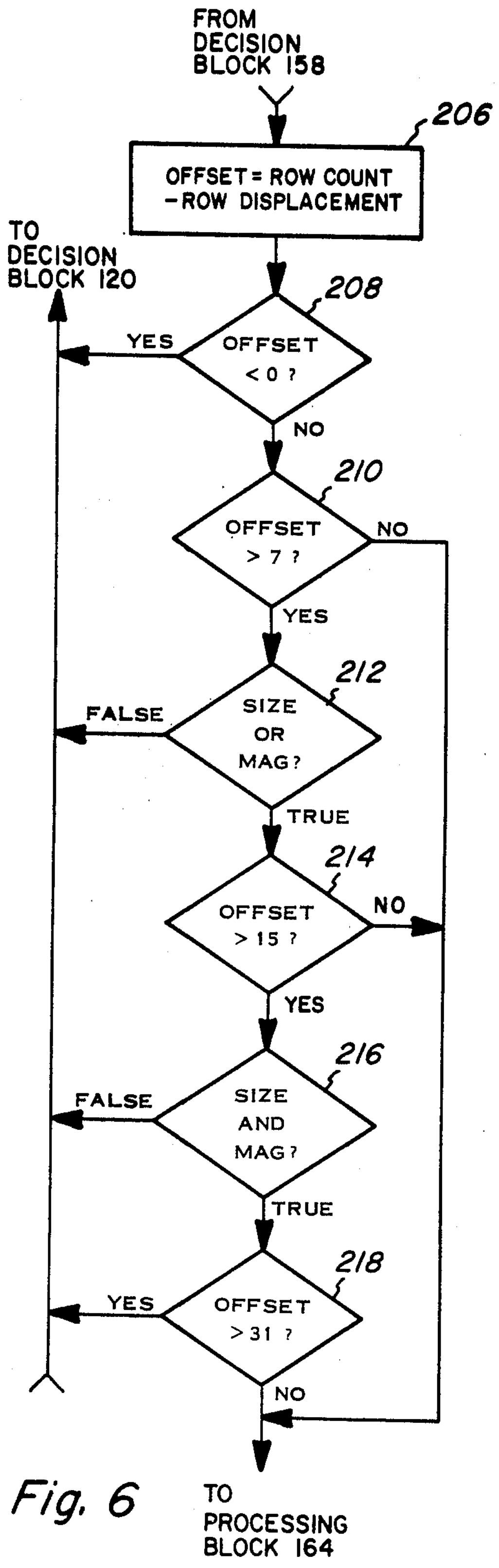
FIG. 6 is an alternative form of a portion of the logic diagram of FIG. 5.

If the row displacement V is not equal to the stop code, the subtract and compare 156 will determine whether the current row count Y is within the desired display range of the current sprite number (decision block 160). If the current row count Y is within the display range for the current sprite number (see FIG. 6), the overlay control 100 will stack the current sprite number into a first-in, first-out sprite stack 162 (processing block 164).

If the row displacement V is equal to the stop code (decision block 158) or if the sprite stack 162 is full (decision block 156) after the current sprite number has been entered therein (processing block 164), the stop flag referred to above is set (processing block 168). Thereafter, or if either the sprite stack 162 is not full (decision block 166) after the current sprite number has been has been entered therein (see processing block 104) or if the current row current Y is not within the display range of the current sprite number (decision block 160), the overlay control 100 again examines the current column and row counts (decision block 120).

On the other hand, if the CPU access index has a value of 3 (decision block 142), or if the stop flag has been set (decision block 144), the overlay control 100 sets a CPU access flag (processing block 170), indicating that a RAM access cycle has been dedicated for the use of the CPU 12, it required. Thereafter, the overlay control 100 again examines the current column and row counts (decision block 120).

If the column count X and the row count Y indicate that the raster scan is positioned between the end of one horizontal row and the start of the next horizontal row in the active display range, the overlay control 100 will enter a sprite post processing procedure 172 (decision block 120). If the sprite stack 162 is not empty (decision block 174), the overlay control 100 will unstack the "top" or first-in sprite number (processing block 176). The overlay control 100 will then request the RAM control 90 to load the column displacement U for the particular sprite number from the sprite name table into a sprite down counter 178 (processing block 180). In response to this VDP access request, the RAM control 90 concatenates the sprite name table base address stored in the sprite name table base register 154 (FIG. 4), the particular sprite number, and an attribute number indicative of the particular byte in the sprite descriptor block which defines the column displacement U, to derive a RAM address for output to the RAM 56. For example, in the preferred form, the column displacement U, to derive a RAM address for output to the RAM 56. for example, in the preferred form, the column displacement U is contained in the second byte of the sprite descriptor block for each of the sprites defined in the sprite name table.

After the column displacement U is loaded into the sprite down counter 178, the overlay control 100 will request the RAM control 90 to load the video color code for the particular sprite number from the sprite name table into a sprite color register 182 (processing block 184). In response to this VDP access request, the RAM control 90 concatenates the sprite name table base address stored in the sprite name table base register 154 (FIG. 4), the particular sprite number, and an attribute number indicative of the particular byte in the sprite descriptor block which defines the video color code, to derive a RAM access for output to the RAM 56. For example, in the preferred form, the video color code is contained in the fourth byte of the sprite description block for each of the sprites defined in the sprite name table.

After the sprite video color code is loaded into the sprite color register 182, the overlay control 100 will request the RAM control 90 to fetch the row displacement V for the particular sprite number from the sprite name table (processing block 180). In response to this VDP access request the RAM control 90 concatenates the sprite name table base address stored in the sprite name table base register 154 (FIG. 4), the particular sprite number, and the attribute number for the particular byte in the sprite descriptor block which defines the row displacement V, to derive a RAM address for output to the RAM 56.

In the subtract and compare 156, the overlay control 100 will compute an offset by subtracting the retrieved row displacement V from the current row count Y (processing block 188). The overlay control 100 will then request the RAM control 90 to load the sprite name for the particular sprite number from the sprite name table into the name latch 122 (processing block 190). In response to this VDP access request, the RAM control 90 concatenates the sprite name table base address stored in the sprite name table base register 154 (FIG. 4), the particular sprite number, and an attribute number indicative of the particular byte in the sprite descriptor block which defines the sprite name, to derive a RAM address for output to the RAM 56. For example, in the preferred form, the sprite name is contained in the third byte of the sprite descriptor block for each of the sprites defined in the sprite name table.

After the sprite name has been loaded into the name latch 122, the overlay control 100 will request the RAM control 90 to load one or more (see FIG. 7) of the bytes or sprite lines from the sprite generator table into a sprite shift register 192 (processing block 194). In response to this VDP access request, the RAM control 90 concatenates a sprite generator table base address stored in a sprite generator table base register 196 (FIG. 4), the sprite name stored in the name latch 122, and the computed offset (see processing block 188), to derive a RAM address for output to the RAM 56.

After the sprite line is loaded into the sprite shift register 192, the overlay control 100 will set the CPU access flag (processing block 198), indicating that a RAM access cycle has been dedicated for the use of the CPU 12, if required. Thereafter, the overlay control 100 again examines the contents of the sprite stack 162 (decision block 174).

If the sprite stack 162 is empty (decision block 174), the overlay control 100 will reset the stop flag (processing block 200), thereby enabling the sprite preprocessing procedure 146 (see decision block 144). The overly control 100 also clears the sprite number contained in the sprite counter 148 (processing block 202), for subsequent use by the sprite preprocessing procedure 146. Thereafter, the overlay control 100 again examines the current column and row counts (decision block 120).

After the raster-scan has reentered the active display range, the sprite downcounter 178 will successively decrement the column displacement contained therein in response to the column control signal provided by the sequence control 92 via the signal path 134. After decrementing to zero, the sprite downcounter 178 will couple the column control signal to the sprite shift register 192. In response to the column control signal, the sprite shift register 192 will successively provide each consecutive bit of the sprite line. Thus, the first pattern signal on the signal path **102*b*** will comprise a time-sequential, digital representation of the particular sprite image only during the portion of other raster scan selected for the display of the sprite.

In the preferred embodiment, the set of sprites defined in the sprite name table may be displayed in a selected one of up to four distinct "sizes." For example, the CPU 12 may reset a MAG bit in a command register 204 (see FIG. 4) to request the overlay control 100 to map each bit in a sprite definition block into a single display pixel, or set the MAG bit to request the overlay control 100 to map each of the bits in the sprite definition block into a 2×2 block of display pixels. Similarly, the CPU 12 may reset a SIZE bit in the command register 204 to request the overlay control 100 to construct each sprite as an 8×8 pattern of display pixels using 8 consecutive 8-bit bytes as a sprite descriptor block, or set the SIZE bit to request the overlay control 100 to construct each sprite as a 16×16 pattern of display pixels using 32 consecutive 8-bit bytes as a sprite descriptor block. If the CPU 12 sets both the MAG and SIZE bits, the overlay control 100 will construct each sprite a 16×16 pattern of 2×2 blocks of pixels using 32 of the 8-bit bytes as a sprite descriptor block. In comparison to the standard or default sprite image, the SIZE bit alone quadruples sprite image area with no loss in detail resolution, while the MAG bit along quadruples sprite image area although with a 4-fold loss in detail resolution. Thus, the effective display range for each sprite will generally be a function of the selected dimensional characteristics (see decision block 160 of FIG. 5).

For example, in the sprite preprocessing procedure 146, the overlay control 100 determines whether the current row count Y is within the display range for each of the sprites defined in the sprite name table (see decision block 160). In making this determination, the overlay control 100 will compute an offset by substracting the row displacement V for a particular sprite number from the current row count Y (processing block 206 of FIG. 6). If the computed offset is less than zero (decision block 208), the row count Y has not yet reached the specified row displacement V and the overlay control 100 may return to examine the current column and row counts (decision block 120 of FIG. 5). However, if the computed offset is greater than zero (decision block 208), but not greater than seven (decision block 210), the current row count Y is clearly within the display range for the particular sprite number and the overlay control 100 will proceed to stack the particular sprite number in the sprite stack 162 (see processing block 164 of FIG. 5).

If the computed offset is greater than 7 (decision block 210) and neither the SIZE nor the MAG bit is set (decision block 212), then the current row count Y is beyond the display range of the particular sprite number and the overlay control 100 may return to examine the current column and row counts (decision 120 of FIG. 5) However, if either the SIZE or the MAG bit is set (decision block 212), and if the computed offset is not greater than 15 (decision block 214), then the current row count Y is within the expanded display range of the current sprite number and the overlay control 100 will proceed to stack the current sprite number in the sprite stack 162 (see processing block 164 of FIG. 5). On the other hand, if the computed offset is greater than 15 (decision block 214) and if both the SIZE and the MAG bits are not set (decision block 216), the current row count Y is beyond the expanded range of the particular sprite and the overlay control 100 can return to examine the current column and row counts (see decision block 120 of FIG. 5). Similarly, if both the SIZE and the MAG bits are set (decision block 216) but the computed offset is greater than 31 (decision block 218), the current row count Y is beyond the maximum display range of the particular sprite and the overlay control 100 can return to examine to current column and row counts (see decision block 120 of FIG. 5). Of course, if both the SIZE and the MAG bits are set (decision block 216), and the computed offset is not greater than 31 (decision block 218), then the current row count Y is within the maximum display range for the particular sprite and the overlay control 100 will proceed to stack the particular sprite number in the sprite stack 162 (see processing block 164 of FIG. 5).

Figure 7:
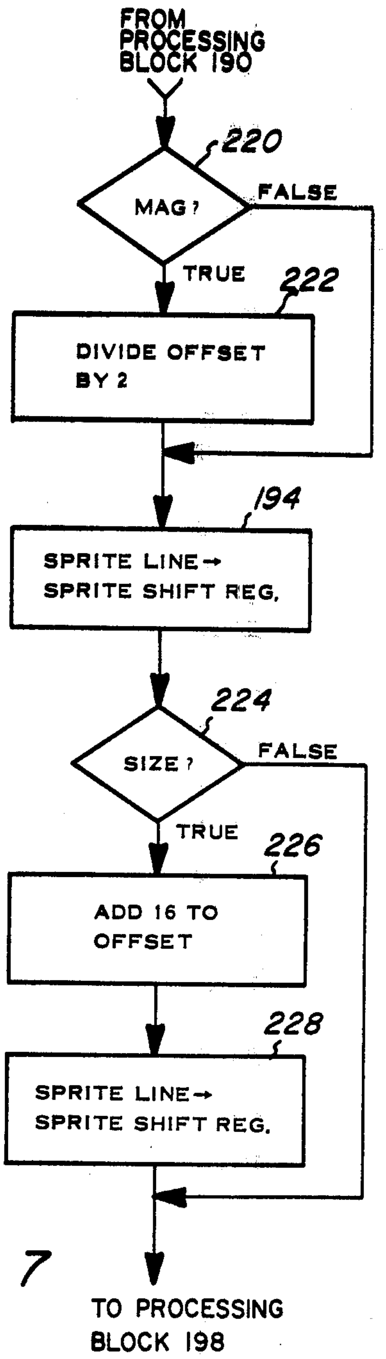
FIG. 7 is an alternative form for one other portion of the logic diagram of FIG. 5.

In the sprite post processing procedure 172, if the MAG bit is round to be set (decision block 220 of FIG. 7) when the sprite shift register 192 is to be loaded (decision block 194 of FIG. 5), the overlay control 100 will divide the computed offset (see processing block 188 of FIG. 5) by 2 (processing block 222 of FIG. 7) before requesting the RAM control 90 to load one of the bytes or sprite lines from the sprite generator table into the sprite shift register 192 (processing block 194 of FIGS. 5 and 7). Thus, each byte of a particular sprite definition block is accessed for each of two consecutive rows of the sprite image. On the other hand, if the SIZE bit is set (decision block 224 of FIG. 7), the overlay control 100 will add 16 to the computed offset (processing block 226) and request the RAM control 90 to load a second byte or sprite pattern line from the upper half of the 32-byte sprite definition block (processing block 228). Of course, if the MAG bit is also set (decision block 220), then the computed offset has already been adjusted (processing block 222) to allow two consecutive accesses to each of the bytes in the upper half of the expanded sprite definition block. Of course, the sprite shift register 192 (see FIG. 3) is constructed to accomodate up to 16 bits or 2 sprite lines from a sprite definition block. Further, the sprite shift register 192 should be responsive to only every other column control signal coupled thereto via the sprite downcounter 178, so that each bit of the sprite line will be provided as the first pattern signal during the movement of the raster scan across two column locations.

In summary, the overlay control 100 processes consecutive portions of the pattern arrays during the period that the raster scan traverses each row within the active display range, so that the parttern data for the particular row is available for immediate display. Substantially simultaneously, the overlay control 100 preprocesses the sprite arrays to select those sprites which are to be displayed on the following row. During the intervening horizontal retrace interval, the overlay control 100 processes only those portions of the sprite arrays associated with the selected sprites, so that the sprite data will be available when the raster scan reaches the appropriate column location in the new row. In this manner, the overlay control 100 is able to perform all necesary pattern and sprite processing functions while still allowing the CPU 12 to have periodic access to the RAM 56.

DESCRIPTION OF THE RAM CONTROL

Figure 8:
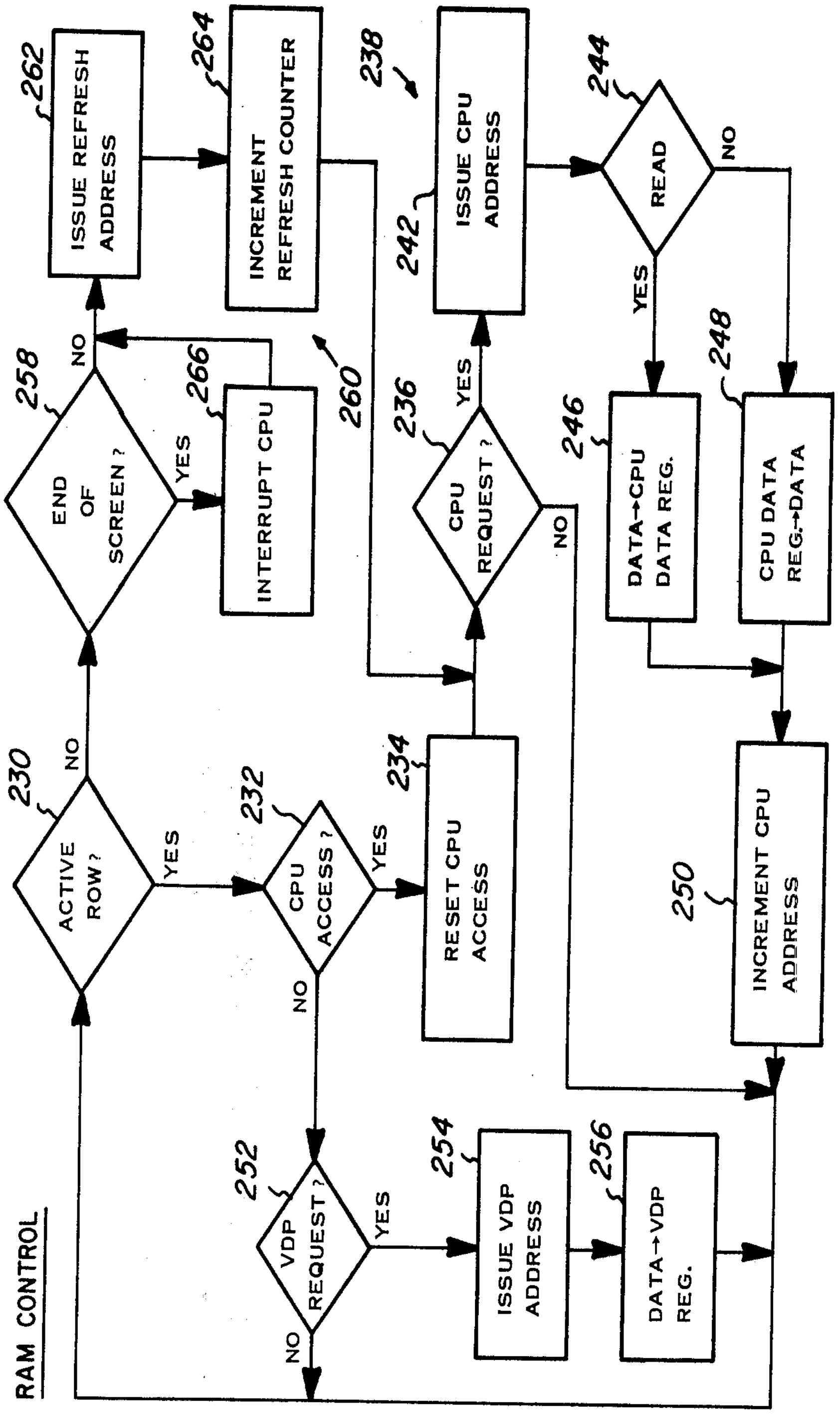
FIG. 8 is a logic diagram illustrating the operation of the RAM control portion of the video display processor.

Shown in FIG. 8 is a logic diagram illustrating the general operation of the RAM control 90 shown in FIG. 2. More particularly, the RAM control 90 is generally responsive to the row count Y provided by the sequence control 92 via the VDP address and data bus 88. Thus, for example, if the current row count Y indicates that the raster scan is positioned in the active display range (decision block 230 of FIG. 8) and if the CPU access flag (see processing block 170 of FIG. 5) is set (decision block 232 of FIG. 8), the RAM control 90 will reset the CPU access flag (processing block 234). If a CPU access request has been initiated via the CPU interface 78 (decision block 236), the RAM control 90 will perform a CPU access procedure 238. Otherwise, the RAM control 90 will return to examine the current row count Y (decision block 230).

In the CPU access procedure 238, the RAM control 90 will transfer the RAM address, initially stored in a CPU address register 240 (FIG. 4) via the CPU interface 78, to the RAM 56 via the RAM bus 58 (processing block 244), the RAM control 90 will place the RAM control 56 in the read state and provide appropriate control signals to latch the data provided by the RAM 56 into the CPU data register 86 (processing block 246). On the other hand, if the CPU access request is a write, the RAM control 90 will place the RAM 56 in a write state and will transfer the data contained in the CPU data register 86 to the RAM bus 58 for storage in the RAM 56 (processing block 248). In either case, the RAM control 90 will then automatically increment the RAM address contained in the CPU address register 240 (processing block 250). Thereafter, the RAM control 90 will again examine the current row count Y (decision block 230).

If the row count Y indicates that the raster scan is within the active display range (decision block 230) and the CPU access flag is not set (decision block 232), but a VDP access request is pending (decision block 252), the RAM control 90 will construct the appropriate RAM address in the manner described above, and issue the RAM addres, together with appropriate RAM control signals, on the RAM bus 38 (processing block 254). Thereafter, the RAM control 90 will provide appropriate control signals to latch the data provided by the RAM 56 into the appropriate register (processing block 256). Thereafter, and if no VDP access request is pending (decision block 252), the RAM control 90 again examines the current row count Y (decision block 230).

When the current row count Y indicates that the raster scan is outside the active display range (decision block 230), but has not yet reached the end of a frame or screen (decision block 258), the RAM control 90 will enter a refresh procedure 260. In the refresh procedure 260, the RAM control 90 performs the necessary RAM accesses to assure that the contents of the RAM 56 are periodically refreshed. More particularly, the RAM control 90 will issue a refresh address (processing block 262), using an internal refresh counter, each time the refresh procedure 260 is performed. Thereafter, the RAM control 90 will increment the refresh counter (processing block 264) by an appropriate amount selected to sequentially address each of the refresh segments of the RAM 56. The RAM control 90 will then determine if a CPU access request is pending (decision block 236).

When the current row count Y indicates that the raster scan is outside the active display range (decision block 230), and has just reached the end of a frame or screen (decision block 258), the RAM control 90 will cooperate with the CPU interface 78 to interrupt the CPU 12 in an appropriate manner (processing block 266). Thereafter, the RAM control 90 will perform the refresh procedure 260.

DESCRIPTION OF THE PRIORITY SELECTOR

Figure 9:
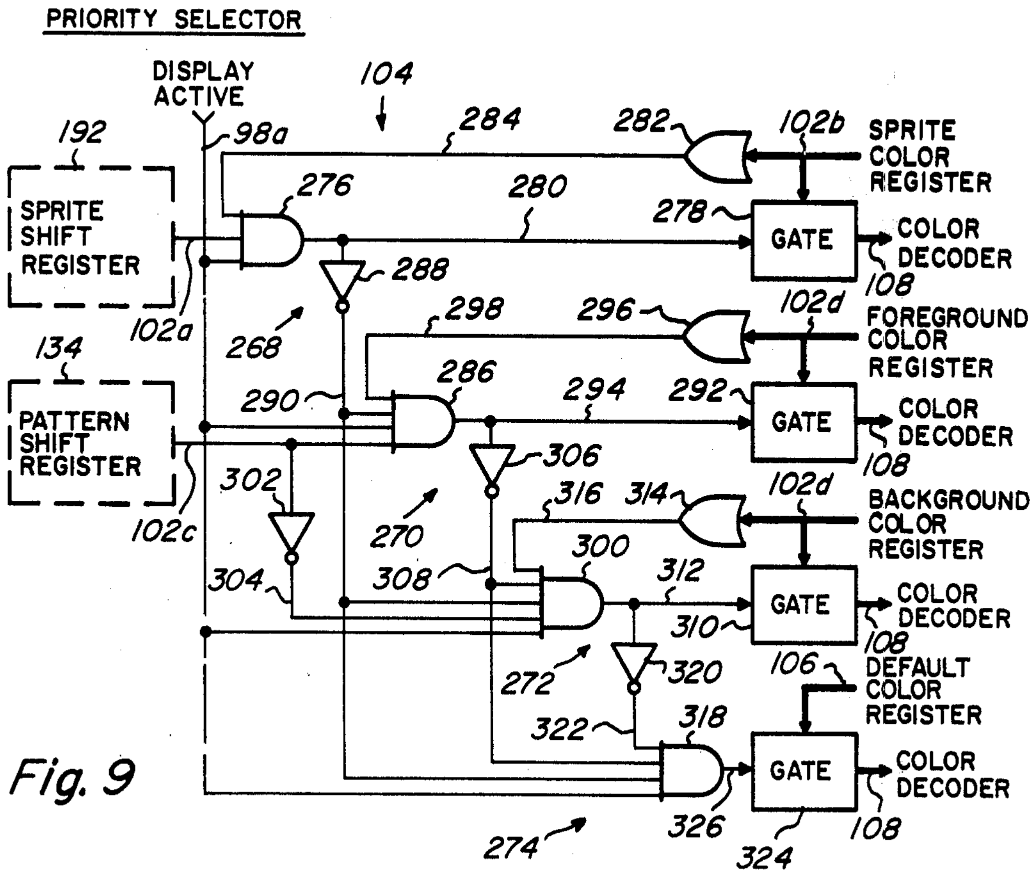
FIG. 9 is a schematic representation of the priority selector portion of the video display processor.

Shown in FIG. 9 is a schematic representation of the circuit comprising the priority selector 104 shown in FIG. 2. The priority selector 104 is comprised primarily of a sprite selector portion 268, a pattern foreground selector portion 270, a pattern background selector portion 272, and a default selector portion 274. In the sprite selector portion 268, an AND gate 276 receives the second pattern signal provided by the sprite shift register 192 via the signal path 102*a*. The AND gate 276 also receives a display active control signal provided by the sequence control 92 via the signal path 98*a*, when the column and row counts indicate that the raster scan is within the active display range. As will be clear to those skilled in the art, the AND gate 276 will provide a sprite select signal in a "high" state for application to a sprite color gate 278 via a signal path 280 only if both the second pattern signal and the display active control signal are in the "high" state. Thus, for example, the sprite select signal will be in the "low" state when the display active control signal on the signal path 98*a* is in the "low" state indicative of the raster scan being outside the active display range. Similarly, the sprite select signal will be in the "low" state when the second pattern signal on the signal path 102*a* has a digital value of "zero" indicative of an inactive pixel in the corresponding portion of the video sprite image. In response to receiving the sprite select signal in the "high" state, the sprite color gate 278 will transfer the video color code provided by the sprite color register 182 via the signal path 102*b* to the color decoder 114 via the color bus 108.

In the preferred form of the present invention, the sprite selector portion 268 also includes an OR gate 282 which provides an output signal for application to the AND gate 276 via a signal path 284 indicative of the state of the video color code provided by the sprite color register 182 via the signal path 102*b*. In particular, the OR gate 282 will provide an output signal in the "high" state via the signal path 284 when the video color code received from the sprite color register 182 via the signal path 102*b* has a digital value other than "zero." On the other hand, the OR gate 282 will provide an output signal in the "low" state when the video color code received via the signal path 102*b* has a digital value of "zero." In the latter case, the AND gate 276 will provide the sprite select signal in the "low" state and the sprite color gate 278 will not transfer the video color code from the signal 102*b* to the color bus 108. Thus, a sprite video color code having the digital value of "zero" effectively results in a clear or transparent state upon mapping into a particular pixel of the sprite image.

In the pattern foreground selector portion 270, an AND gate 286 receives the first pattern signal provided by the pattern. shift register 134 via the signal path 102*c*. The AND gate 286 also receives the display active control signal provided by the sequence control 92 via the signal path 98*a*. In addition, the AND gate 286 receives the logical complement of the sprite select signal provided by the AND gate 276 via an inverter 288 interposed between the signal path 280 and a signal path 290. As will be clear to those skilled in the art, the AND gate 286 will provide a foreground select signal in a "high" state for application to a foreground color gate 292 via a signal path 294 only if both the first pattern signal and the display active control signal are in the "high" state and the sprite select signal is in the "low" state. Thus, for example, the foreground select signal will be in the "low" state when the display active control signal on the signal path 98*a* is in the "low" state indicative of the raster scan being outside the active display range. Similarly, the pattern select signal will be in the "low" state when the first pattern signal on the signal path 102*c* has a digital value of "zero" indicative of an inactive pixel in the corresponding portion of the video pattern image. In addition, however, the foreground select signal will be in the "low" state when the sprite select signal on the signal path 280 is in the "high" state indicating that the sprite is active at the particular pixel. In other words, the foreground select portion 270 is overridden or inhibited when the sprite select portion 268 is active, so that the sprite image is effectively "superimposed" on the pattern image. On the other hand, if the sprite selector portion 268 is inactive but the pattern foreground selector portion 270 is active, the foreground color gate 292 will respond to the foreground select signal in the "high" state by transferring the video color code provided by the foreground portion of the pattern color register 128 via the signal path **102*d* to the color decoder 114 via the color bus 108**.

As in the sprite selector portion 268, the preferred form of the pattern foreground selector portion 270 also includes an OR gate 296 which provides an output signal for application to the AND gate 286 via a signal path 298 indicative of the state of the video color code provided by the foreground portion of the pattern color register 128 via the signal path **102*d*. In particular, the OR gate 296 will provide an output signal in the "high" state via the signal path 298 when the video color code received from the foreground portion of pattern color register 128 via the signal path 102*d* has a digital value other than "zero." On the other hand, the OR gate 296 will provide an output signal in the "low" state when the video color code received via the signal path 102*d* has a digital value of "zero." In the latter case, the AND gate 286 will provide the foreground select signal in the "low" state and the foreground color gate 292 will not transfer the video color code from the signal path 102*d* to the color bus 108**. Thus, a pattern foreground video color code having the digital value of "zero" effectively results in a clear or transparent state upon mapping into a particular pixel of the pattern image.

In the pattern background selector portion 272, an AND gate 300 receives the logical inverse of the first pattern signal provided by the pattern shift register **102*c* via an inverter 302 interposed between the signal path 102*c* and a signal path 304. The AND gate 300 also receives the display active control signal provided by the sequence control 92 via the signal path 98*a*. As in the pattern foreground selector portion 270, the AND gate 300 receives the logical inverse of the sprite select signal provided by the inverter 288 via the signal path 290. In addition, however, the AND gate 300 receives the logica inverse of the pattern foreground select signal via an inverter 306 interposed between the signal path 294 and a signal path 308. As will be clear to those skilled in the art, the AND gate 300 will provide a background select signal in a "high" state for application to a background color gate 310 via a signal path 312 only if (1) the display active control signal is in the "high" state, (2) the first pattern signal is in the "low" state, (3) the sprite select signal is in the "low" state, and (4) the foreground select signal is in the "low" state. Thus, for example, the background select signal will be in the "low" state when the display active control signal on the signal path 98*a* is in the "low" state indicative of the raster scan being outside the active display range. Similarly, the background select signal will be in the "low" state when the first pattern signal on the signal path 102*c* has a digital value of "one" indicative of an active pixel in the corresponding portion of the video pattern image. In addition, however, the background select signal will be in the "low" state when either the sprite select signal on the signal path 280 or the foreground select signal on the signal path 294 is in the "high" state. In other words, the background select signal will be in the "high" state only when the sprite select portion 268 and the pattern foreground select portion 270 are both inactive but the raster scan is in the display range. In response to receiving the background select signal in the "high" state, the background color gate 310 will transfer the video color code provided by the background portion of the pattern color register 128 via the signal path 102*d* to the color decoder 114 via the color bus 108**.

In the preferred form, the background selector portion 272 also includes an OR gate 314 which provides an output signal for application to the AND gate 300 via a signal path 316 indicative of the state of the video color code provided by the background portion of the pattern color register 128 via the signal path **102*d*. In particular, the OR gate 314 will provide an output signal in the "high" state via the signal path 316 when the video color code received from the background portion of the pattern color register 128 via the signal path 102*d* has a digital value other than "zero." On the other hand, the OR gate 314 will provide an output signal in the "low" state when the video color code received via the signal path 102*d* has a digital value of "zero." In the latter case, the AND gate 300 will provide the background select signal in the "low" state and the background color gate 310 will not transfer the video color code from the signal path 102*d* to the color bus 108**. Thus, a pattern background video color code having the digital value of "zero" effectively results in a clear or transparent state upon mapping into a particular pixel of the pattern image.

In the default selector portion 274, an AND gate 318 receives the display active control signal provided by the sequence control 92 via the signal path **98*a*. As in the pattern background selector portion 272, the AND gate 318 receives the logical inverse of the sprite select signal provided by the inverter 288 via the signal path 290, and the logical inverse of the foreground select signal provided by the inverter 306 via the signal path 308. In addition, however, the AND gate 318 also receives the logical inverse of the background select signal via an inverter 320 interposed between the signal path 312 and a signal path 322. As will be clear to those skilled in the art, the AND gate 318 will provide a default select signal in a "high" state for application to a default color gate 324 via a signal path 326 only if (1) the display active control signal is in the "high" state, (2) the sprite select signal is in the "low" state, (3) the foreground select signal is in the "low" state, and (4) the background select signal is in the "low" state. Thus, for example, the default select signal will be in the "low" state when the display active control signal on the signal path 98*a* is in the "low" state indicative of the raster scan being outside the active display range. Similarly, the sprite select signal will be in the "low" state when any one of the sprite select, foreground select, or the background select signals on the signal paths 280, 294, and 312, respectively, has a digital value of "zero" indicative of inactive pixels in each of the corresponding portions of the sprite or pattern images. In other words, the default select signal will be in the "high" state only when the sprite selector portion 268, the pattern foreground selector portion 270, and the pattern background selector portion 272 are each inactive but the raster scan is in the active display range. In response to receiving the default select signal in the "high" state, the default color gate 324 will transfer the video color code stored in a default color register 328 (see FIG. 4) and provided via the default color bus 106 to the color decoder 114 via the color bus 108**.

In summary, the priority selector 104 is responsive to each of the first and second pattern signals provided by the overlay control 100 when the display active control signal provided by the sequence control 92 indicates that the raster scan is in the active display range. In particular, the priority selector 104 will transfer a non-transparent sprite video color code from the sprite color register 182 to the color decoder 114 when the second pattern signal indicates that the sprite is active at the current pixel. On the other hand, when the second pattern signal indicates that the sprite is inactive but the first pattern signal indicates that the pattern is active at the current pixel, the priority selector 104 will transfer a non-transparent foreground video color code from the foreground portion of the pattern color register 128 to the color decoder 114. If the first and second pattern signals indicate that both the sprite and pattern are inactive at the current sprite, the priority selector 104 will transfer a non-transparent background video color code from the background portion of the pattern color register 128 to the color decoder 114. If no other non-transparent video color code is selected for display, as in a border area, the priority selector 104 will transfer a default video color code from the default color register 328 to the color decoder 114.

DESCRIPTION OF THE COLOR PHASE GENERATOR

Figure 10:
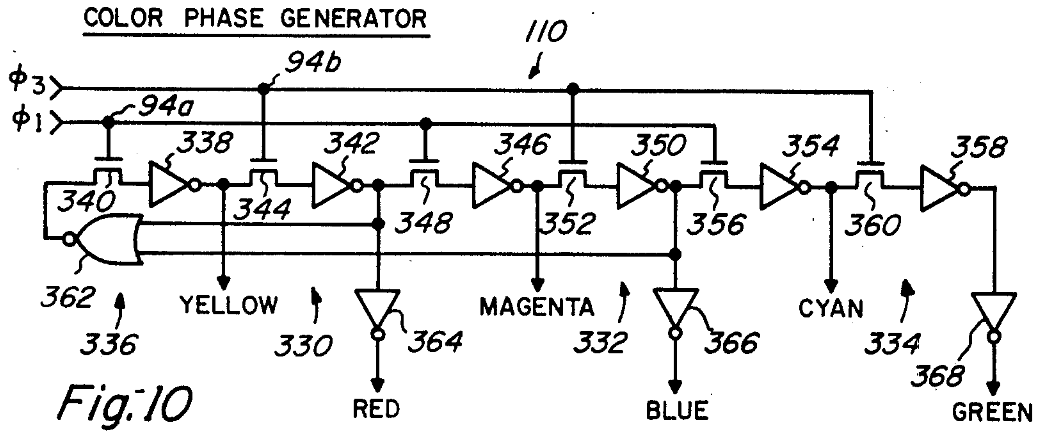
FIG. 10 is a schematic representation of the color phase generator portion of the video display processor.

Shown in FIG. 10 is a schematic representation of the circuit comprising the color phase generator 110 shown in FIG. 2. In general, the color phase generator 110 is responsive to the color reference signal provided by the sequence control 92 via the signal path 94 (See FIG. 2). In the preferred form, the sequence control 92 provides the color reference signal as a pair of complementary clock signals, 01 and 03, having a frequency of 10.738635 MHz or three times the NTSC 3.57 MHz color carrrier (see FIG. 12). In response to the color reference signal, the color phase generator 110 provides six color phase signals having the NTSC 3.57 MHz color carrier frequency, but shifted in phase by a predetermined number of degrees to approximate the six NTSC standard color reference signals for the colors yellow, red, magenta, blue, cyan, and green.

In the preferred form, the color phase generator 110 comprises a 3-stage ring counter, with each stage providing interlaced complementary outputs. In particular, the color phase generator 110 is comprised of a first stage 330, a second stage 332, a third stage 334, and a feedback network 336. In the first stage 330, a second stage 332, a third stage 338 has the input thereof connected to the output of the feedback network 336 via a gate transistor 340 in phase with the 01 clock signal connected to the gate thereof via the signal path 94*a*. The inverter 338 has the output thereof connected to the input of an inverter 342 via a gate transistor 344 in phase with the 03 clock signal connected to the gate thereof via the signal path 94*b*. In the second stage 332, an inverter 346 has the input thereof connected to the output of the inverter 342 of the first stage of 330 via a gate transistor 348 in phase with the 01 clock signal connected to the gate thereof via the signal path 94*a*. The inverter 346 has the output thereof connected to the input of an inverter 350 via a gate transistor 352 in phase wth the 03 clock signal connected to the gate thereof via the signal path 94*b*. In the third stage 334, an inverter 354 has the input thereof connected to the output of the inverter 350 of the second stage 332 via a gate transistor 356 in phase with the 01 clock signal connected to the gate thereof via the signal path 94*a*. The inverter 354 has the output thereof connected to the inout of an inverter 358 via a gate transistor 360 in phase with the 03 clock signal connected to the gate thereof via the signal path 94*b*. In the feedback network 336, a NOR gate 362 has one input thereof connected to the output of the inverter 342 of the first stage 330, one other input thereof connected to the output of the inverter 350 of the second stage 332, and the output thereof connected to the input of the inverter 338 of the first stage 330 via the gate transistor 340.

As will be clear to those skilled in the art, the color phase generator 110 is constructed so that one and only one of the inverters 338, 346, and 354 will provide an output signal in a "low" state during each cycle of the 01 clock signal. Similarly, one and only one of the inverters 342, 350 and 358 will provide an output signal in a "high" stage during each cycle of the 03 clock signal. THus, by inverting the output of the inverters 342, 350 and 358 via inverters 364, 366 and 368, respectively, a set of six color reference signals is obtained wherein two and only two of the color reference signals are in the "low" state during each half cycle of the the 01 and 03 clock signals. For convenience of reference, the outputs of the inverters 338, 364, 346, 366, 354 and 368 have been designated in FIG. 10 and 11 by an appropriate one of the six NTSC standard colors; i.e. yellow, red, magenta, blue, cyan, and green.

DESCRIPTION OF THE COLOR DECODER AND VIDEO MIXER

Figure 11:
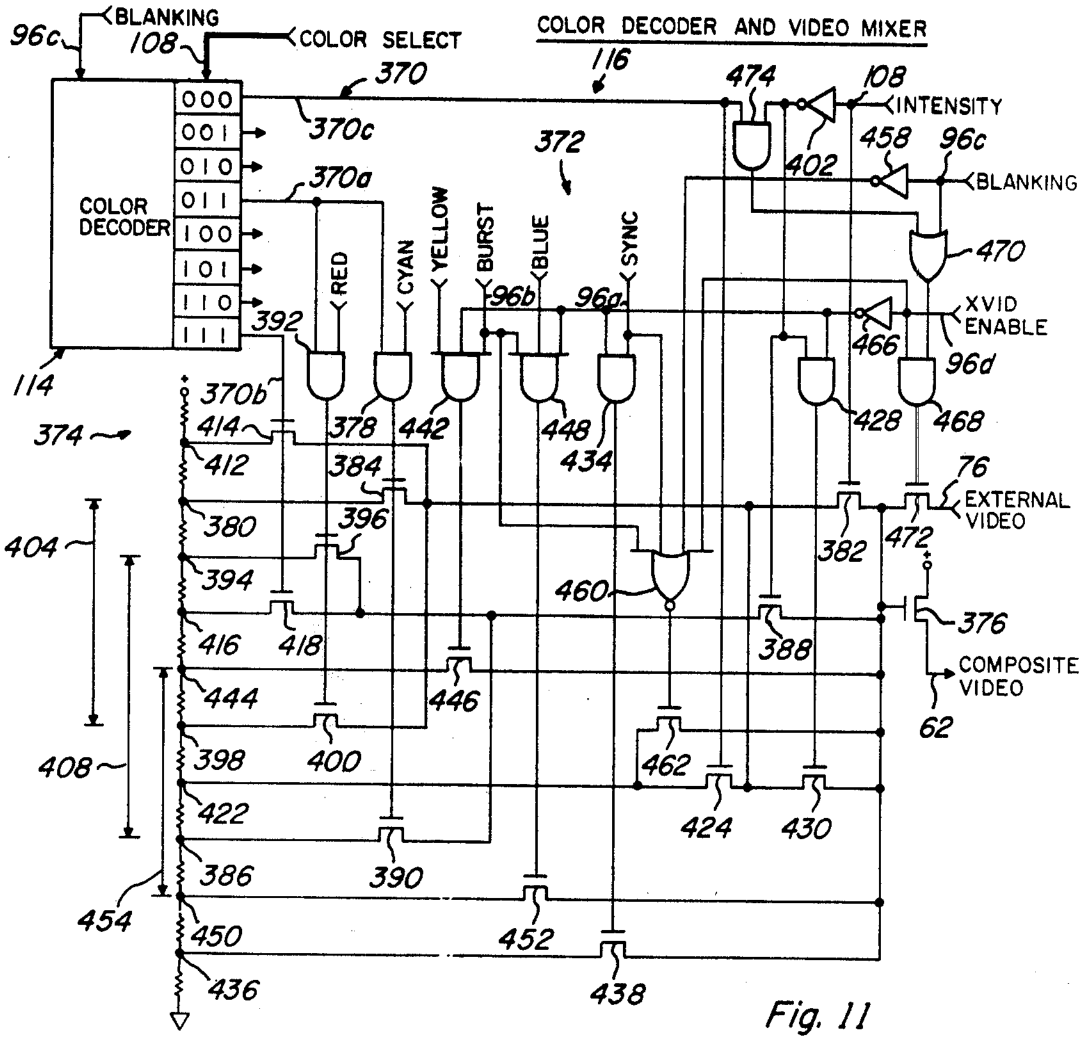
FIG. 11 is a schematic representation of the color decoder and video mixer porltions of the video display processor.

Shown in FIG. 11 is a schematic representation of the color decoder 114 and the video mixer 116 shown in FIG. 2. As appropriate, reference will be made to the waveform diagrams shown in FIG. 12 to illustrate the operation of the color decoder 114 and the video mixer 116.

In general, the color decoder 114 receives a color select portion of the video color code provided by the priority selector 104 via the color bus 108. In the preferred form, the color select portion of the video color code is comprised of three color select bits. In response to each unique combination of the three color select bits, the color decoder 114 provides an output signal in a "high" state via a particular color select line 370. For example, as in a conventional 3-to-8-line decoder, the color decoder 114 will provide an output signal in the "high" state via a color select line 370*a* response to receiving a color select bit pattern of "011." Similarly, the color decoder 114 will provide an output signal in the "high" state via a color select line 370*b* in response to receiving a color select bit pattern of "111." In response to receiving a color select bit pattern of "000," the color decoder 114 will provide an output signal in the "high" state via a color select line 370*c*.

In general, the video mixer 116 operates in a color generation mode, a sync generation mode, or an external video mode, depending upon the state of the sync signals provided by the sequence control 92 via the signal path 96. In the color generation mode, a gating network 372 selectively couples reference voltages provided by a voltage divider 374 to the gate of a mixer transistor 376, generally in phase with a complementary pair of the color reference signals provided by the color phase generator 110. In the preferred form, a digital value of "011" in the color select portion of the video color code represents the colors cyan or red, depending upon the digital value of an intensity portion of the video color code. Thus, for example, in response to receiving a signal in the "high" state on the color select line 370*a*, and AND gate 378 will simultaneously connect an upper cyan reference voltage at a tap point 380 of the voltage divider 374 to a high intensity transistor 382 via a gate transistor 384, and a lower cyan reference voltage at a tap point 386 of the voltage divider 374 to a low intensity transistor 388 via a gate transistor 390, in phase with the cyan color reference signal provided by the inverter 354 of the clor phase generator 110. In a similar manner, an AND gate 392 will simultaneously connect an upper red reference voltage at a tap point 394 of the voltage divider 374 to the low intensity transistor 388 via a gate transistor 396, and a lower red reference voltage at a tap point 398 of the voltage divider 374 to the high intensity transistor 382 via a gate transistor 400, but in phase with the red color reference signal provided by the inverter 364 of the color phase generator 110.

In the preferred form, the high intensity transistor 382 is controlled by an intensity bit portion of the video color code provided by the priority selector 104 via the color bus 108. On the other hand, the low intensity transistor 388 is controlled by the logical inverse of the intensity bit via an inverter 402. Thus, the upper cyan reference voltage and the lower red reference voltage will be connected to the gate of the mixer transistor 376 in an alternating manner generally in phase with cyan and red reference signals, respectively, when the intensity bit of the video color code on the color bus 108 is in the "high" state. In contrast, the lower cyan reference voltage and the upper red reference voltage will be connected to the gate of the mixer transistor 376 in an alternating manner in phase with the cyan and red color reference signals, respectively, when the intensity bit of the video control code on the color bus 108 is in the "low" state.

Figure 12:
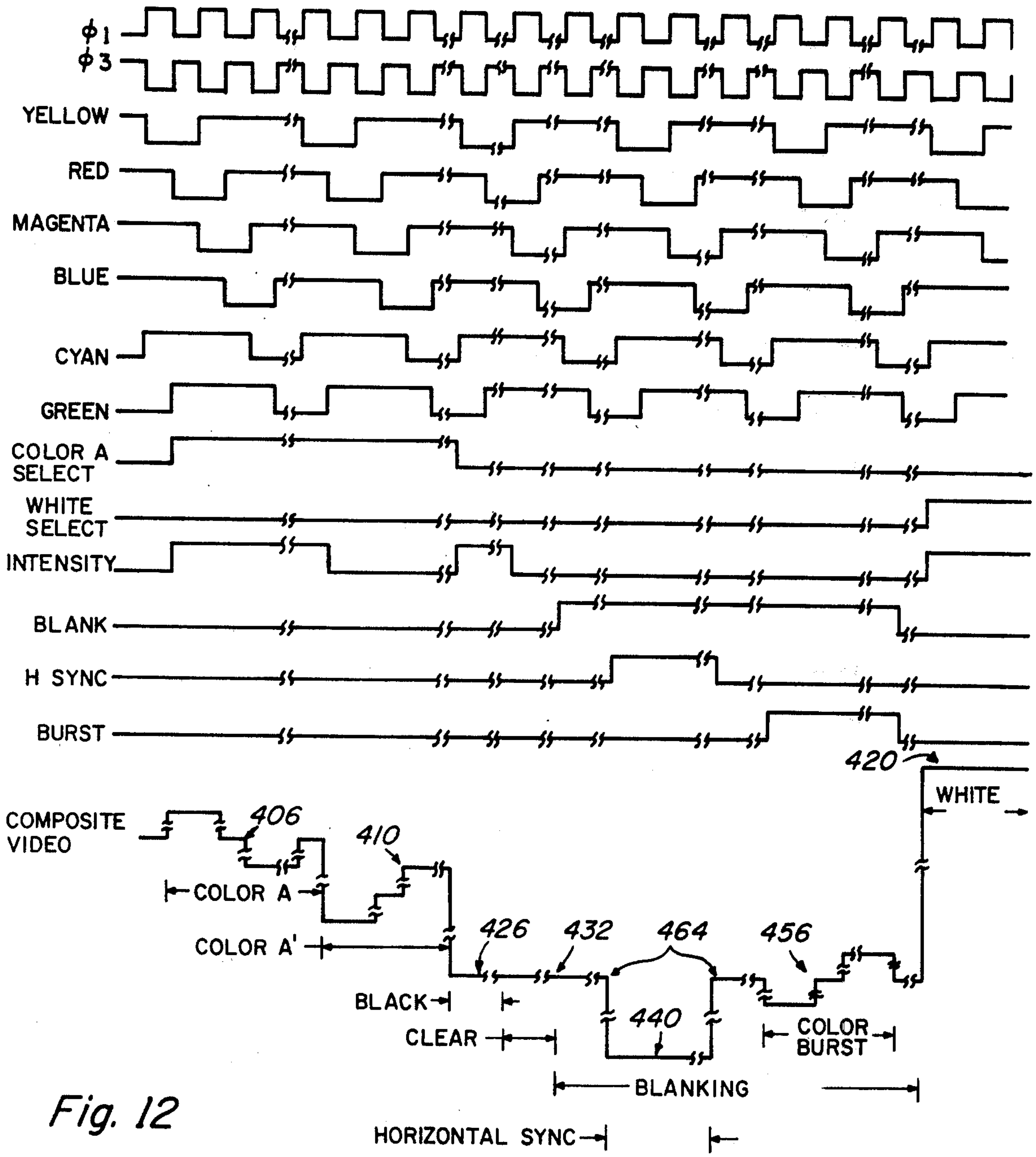
FIG. 12 is a multi-waveform diagram illustrating the operation of the video generator portion of the video display processor.

In the preferred form, the upper cyan reference voltage and the lower red reference voltage are selected to have a potential difference 404 proportional to the chrominance value characteristic of the color cyan and an average potential proportional to a medium luminance value, so that the signal applied to the gate of the mixer transistor 376 via the high intensity transistor 382 will produce a composite video signal on the signal path 62 which digitally approximates the standard video waveform for the color cyan as at 406 in FIG. 12. In a similar manner, the lower cyan reference voltage and the upper red reference voltage are selected to have a potential difference 408 proportional to the chrominance value characteristic of the color red and an average potential proportional to a relatively low luminance value, so that the signal applied to the gate of the mixer transistor 376 via the low intensity transistor 388 will produce a composite video signal on the signal path 62 which digitally approximates the standard video waveform for the color dark red, as at 410 in FIG. 12. Similar configurations of AND gates and gate transistors are provided for each of the color select lines 370 associated with the video color codes having a color select portion other than "000" and "111."

As will be clear to those skilled in the art, the video waveforms corresponding to the colors white and gray have a fixed luminance value and no chrominance value. In the preferred form, a digital value of "111" in the color select portion of the video color represents the colors white or grey, depending upon the digital value of the intensity portion of the video color code. Accordingly, the output signal provided by the color decoder 114 via the color select line 370*b* is employed to simultaneously connect a white reference voltage at a tap point 412 of the voltage divider 374 to the high intensity transistor 382 via a gate transistor 414, and a gray reference voltage at a tap point 416 of the voltage divider 374 to the low intensity transistor 388 via a gate transistor 418. if the white reference voltage is selected to be proportional to the luminance value of the color white, the signal applied to the gate of the mixer transistor 376 via the high intensity transistor 382 will produce a composite video signal on the signal path 62 which digitally approximates the video waveform for the color white, as at 420 in FIG. 12. Similarly, if the gray reference voltage is selected to be proportional to the luminance value for the color gray, the signal applied to the gate of the mixer transistor 376 via the low intensity transistor 388 will produce a composite video signal on the signal path 62 which digitally approximates the video waveform for the color gray (not shown in FIG. 12).

As in the case of the colors white and gray, the color black has a fixed luminance value, and no chrominance value. In the preferred form, a digital value of "000" in the color select portion of the video color code represents the color black or the transparent state, depending upon the digital value of the intensity bit portion of the video color code. Accordingly, the output signal provided by the color decoder 114 via the color select line 370c is employed to connect a black reference voltage at a tap point 422 of the voltage divider 374 to the high intensity transistor 382 via a gate transistor 424. Thus, if the intensity bit is in the "high" state, the signal applied to the gate of the mixer transistor 376 via the high intensity transistor 382 will produce a composite video signal via the signal path 62 which digitally approximates the video waveform for the color black, as at 426 in FIG. 12. On the other hand, if the intensity bit is in the "low" state, an AND gate 428 will connect the black reference voltage gated via the gate transistor 424 to the gate of the mixer transistor 376 via a gate transistor 430, and the composite video signal on the signal path 62 will digitally approximate the video waveform for the color black, as at 432 in FIG. 12.

In the sync generation mode, the gating network 372 selectively couples reference voltages provided by the voltage divider 374 to the gate of the mixer transistor 376, generally in response to the sync signals provided by the sequence control 92 via the signal path 96. For example, in response to receiving a sync signal in the "high" state via a signal path 96*a*, an AND gate 434 will connect a sync reference voltage at a tap point 436 of the voltage divider 374 to the gate of the mixer transistor 376 via a gate transistor 438. If the sync reference voltage is selected to be proportional to the standard sync value, the signal applied to the gate of the mixer transistor 374 will produce a composite video signal on the signal path 62 which digitally approximates the video waveform for a horizontal sync pulse, as at 440 in FIG. 12.

In response to receiving a burst signal in the "high" state on the signal path 96*b*, an AND gate 442 will connect an upper burst reference voltage at a tap point 444 of the voltage divider 374 to the gate of the mixer transistor 376 via a gate transistor 446, in phase with the yellow color reference signal provided by the inverter 338 of the color phase generator 110. In a similar manner, an AND gate 448 will connect a lower burst reference voltage at a tap point 450 of the voltage divider 374 to the gate of the mixer transistor 376 via a gate transistor 452, but in phase with the blue color reference signal provided by the inverter 366 of the color phase generator 110. Thus, the upper burst reference voltage and the lower burst reference voltage will be connected to the gate of the mixer transistor 376 in an alternating manner generally in phase with the yellow and blue color reference signals. By selecting the upper and lower burst reference voltages to have a potential difference 454 proportional to the peak-to-peak value characteristic of the NTSC color burst and an average potential proportional to the standard blanking level, the signal applied to the gate of the mixer transistor 376 will produce a composite video signal on the signal path 62 which digitally approximates the standard video waveform for the color burst, as at 456 in FIG. 12.

In response to receiving a blanking signal in the "high" state via a signal path 96*c*, an inverter 458 will provide an output signal in the "low" state for application to a NOR gate 460. The NOR gate 460 also receives the sync and burst signals provided by the sequence control 92 via the signal paths 96*a* and 96*b*, respectively. As will be clear to those skilled in the art, the NOR GATE 460 will provide an output signal in the "high" state only when the blanking signal is in the "high" state and both the sync and burst signals are simultaneously in the "low" state. Thus, the NOR gate 460 will connect the black reference voltage at the tap point 422 of the voltage divider 374 to the gate of the mixer transistor 376 via a gate transistor 462 only during those portions of the normal blanking interval not dedicated to the horizontal sync pulse and the color burst. Since the black reference voltage has been selected to have a potential proportional to the standard blanking level, the signal applied to the gate of the mixer transistor 376 via the gate transistor 462 will produce a composite video signal on the signal path 62 which digitally approximates the standard video waveform for the blanking interval, as at 464 in FIG. 12. The blanking signal on the signal path 96*c* is also applied to the color decoder 114, so that the output signal on each of the color select lines 370 is in the "low" state during the blanking interval.

In the external video mode, an inverter 466 will provide an output signal in the "low" state for application to each of the AND gates 434, 442, and 448, in response to receiving an external video enable signal provided by the sequence control 92 via a signal path 96*d*. The external video enable signal on the signal path 96*d* is also applied to the NOR gate 460. As a result, the output signals provided by the AND gates 434, 442 and 448, and by the NOR gate 460 remain in the "low" state during the entire blanking interval, thereby inhibiting the generation of the composite video signal in this interval. Instead, an AND gate 468, responsive to the external video enable signal on the signal path 96*d* and the blanking signal on the signal path 96*c* via an OR gate 470, connects an external video signal received via the signal path 76 to the gate of the mixer transistor 376 via a gate transistor 472. Assuming that the sequence control 92 has been synchronized in a conventional manner with the external source of the external video signal, the resultant composite video signal on the signal path 62 will have blanking, sync and burst levels proportional to those contained in the external video signal.

In addition to substituting the synchronizing portions of the external video signal for the internally generated values, the preferred form of the video mixer 116 also passes the information portion of the external video signal when the video color code provided by the priority selector 104 corresponds to the transparent state. In particular, the output signal provided by the inverter 466 is also connected to the AND gate 428 to maintain the output signal provided thereby in the "low" state when the external video signal on the signal path 96*d* is in the "high" state. Thus, the cooperative gating of the black reference voltage via the gate transistors 424 and 430 is suppressed. Instead, an AND gate 474, responsive to the color select line 370*c* and the logic inverse of the intensity bit provided by the inverter 402, will provide an output signal in the "high" state via the OR gate 470 to enable the AND gate 468 when the external video enable signal is also in the "high" state. As a result, the AND gate 468 will connect the external video signal on the signal path 76 to the gate of the mixer transistor 376 via the gate transistor 472. In other words, a video color code corresponding to the transparent state will result in a composite video signal on the signal path 62 with a digital waveform approximating the color black (as at 426 in FIG. 12) when the video mixer 116 is not in the external video mode, but in a composite video signal substantially the same as the external video signal on the signal path 76 when the video mixer 116 is in the external video mode.

DESCRIPTION OF THE ROM

Figure 13:
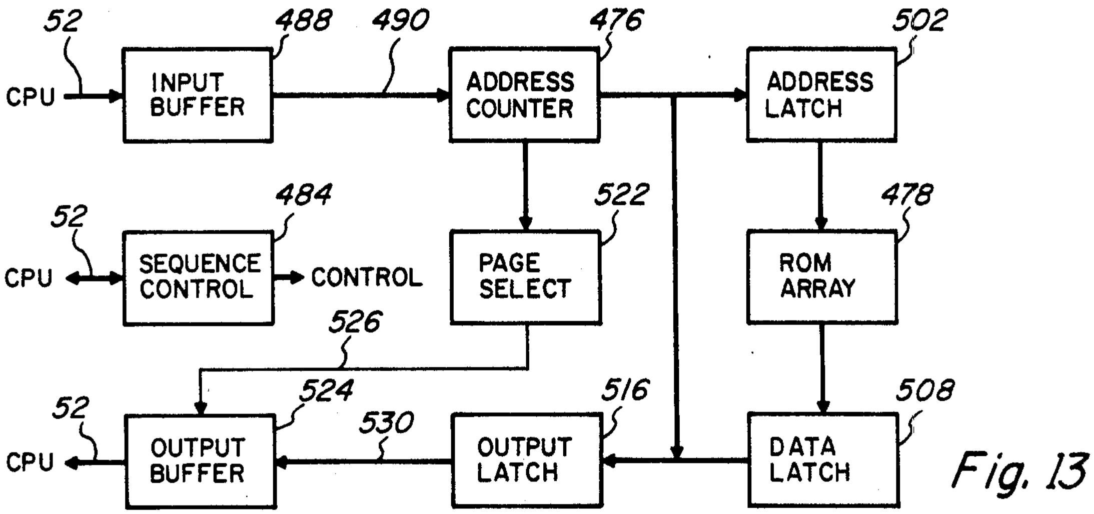
FIG. 13 is a block diagram of the slow ROM shown in FIG. 1.
Figure 14:
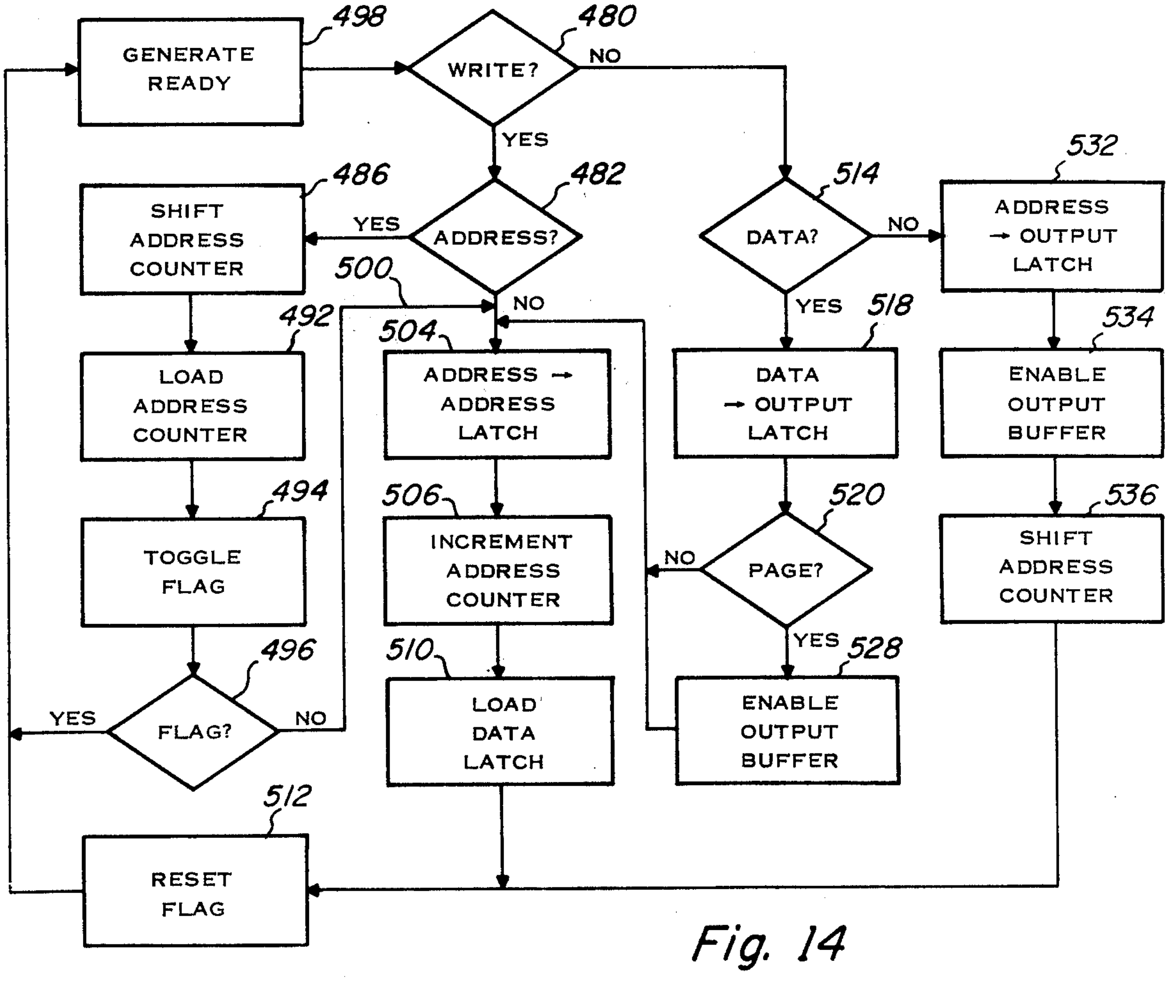
FIG. 14 is a logic diagram illustrating the operation of the slow ROM shown in FIG. 13.

Shown in FIg. 13 is a block diagram illustrating the operation of each discrete device comprising the slow ROM 48 (FIG. 1), generally in accordance with the logic diagram shown in FIG. 14. In general, the ROM 48 is responsive to ROM access requests provided by the CPU 12 via the memory bus 46, and coupled to the auxiliary bus 52 via the bus buffer 50. In particular, the CPU 12 may write a new address into an address counter 476 in the ROM 48, read the address currently in the address counter 476, or read the data contained in a ROM array 478 at the address contained in the address counter 476. In the preferred form, the ROM array 478 contains 6144 8-bit bytes of processing information, each of which is sequentially or randomly addressable via the lower 13 bits of a 16 bit address. The upper 3 bits of the 16 bit address comprise a page designation which specifies a desired one of eight individual devices comprising the ROM 48, in the manner set forth below.

In response to receiving a write (decision block 480) address (decision block 482) ROM access request from the CPU 12 generally via the auxiliary bus 52, a sequence control 484 prepares to receive the first 8 of the 26 bits comprising the new address by shifting the address bits contained in the lower 8 bit positions of the address counter 476 into the upper 8 bit positions thereof (processing block 486). When the first 8 address bits of the new address become available on the auxiliary bus 42, the sequence control 484 enables an input buffer 488 and loads the first 8 address bits into the lower 8 bit positions of the address counter 476 via an input 490 (processing block 492). To "remember" that the first 8 bits of the new address have already been loaded, the sequence control 484 toggles an internal flag (processing block 494). If, as a result, the flag is in the set state (decision block 496), the sequence control 484 will generate a ready signal (processing block 498) for application to the CPU 12 via the auxiliary bus 52, indicating that the ROM 48 is ready to receive the second 8 bits of the address.

Upon receiving a second write (decision block 480) address (decision block 482) ROM access request, the sequence control 484 will shift the first 8 bits of the new address from the lower 8 bits positions of the address counter 476 into the upper 8 bit positions thereof (processing block 486). When the second 8 bits of the new address are provided by the CPU 12 via the auxiliary bus 52, the sequence control 484 will enable the input buffer 488 and load the second 8 bits of the new address into the lower 8 bit positions in the address counter 476 via the input bus 490 (processing block 492). If, after the flag has been toggled a second time (processing block 494), the flag is in the reset state (decision block 496), the sequence control 484 will perform an auto-incrementing procedure 500.

In the auto-incrementing procedure 500, the sequence control 484 will load the address currently contained in the address counter 476 into an address latch 502 (processing block 504). The sequence control 484 will then increment the address contained in the address counter 476 (processing block 506). Using the address contained in the address latch 502, the sequence conrol 484 then transfers the processing information contained in the ROM array 478 at the particular address location into a data latch 508 (processing block 510). Upon completion of the auto-incrementing procedure 500, the sequence control 484 will make sure that the flag is reset (processing block 512) and then generate the ready signal (processing block 498) to indicate to the CPU 12 that the ROM 48 is ready to receive the next ROM access request from the CPU 12.

If the subsequent ROM access request is a read (decision block 480) data (decision block 514) command, the sequence control 484 will transfer the processing information stored in the data latch 508 into an input latch 516 (processing block 518). If the page designation portion of the address contained in the address counter 476 corresponds to the unique page number assigned to the particular device at the time of manufacturing (decision block 520), a page select 522 will enable an output buffer 524 via a signal path 526 (processing 528), to couple the processing information provided by the output latch 516 via an output bus 530 to the auxiliary bus 52. Thereafter, or if the page number does not correspond (decision block 520), the sequence control 484 will perform the auto-incrementing procedure 500, described above, make sure that the flag is reset (processing block 512), and generate the ready signal (processing block 498) to indicate that the requested data is available on the auxiliary bus 52.

In response to receiving a read (decision block 480) address (decision block 514) ROM access request, the sequence control 484 will transfer the 8 address bits contained in the upper 8 bit positions of the address counter 476 to the output latch 516 (processing block 532). The sequence control 484 will then enable the output buffer 524 (processing block 534) to couple the upper address byte provided by the output latch 516 via the output bus 530 to the auxiliary bus 52. The sequence control 484 then shifts the 8 address bits contained in the lower 8 bit positions of the address counter 476 into the upper 8 bit positions thereof (processing block 536). Thereafter, the sequence control 484 will make sure that the flag is reset (processing block 512), and will generate the ready signal (processing block 498) to indicate to the CPU 12 that the upper byte of the address is available on the auxiliary bus 52.

Upon receiving a subsequent read (decision block 480) address (decision block 514) command, the sequence control 484 will transfer the lower byte of the address, now in the upper 8 bit positions of the address counter 476, to the output latch 516 (processing block 532), and enable the output buffer 524 (processing block 534) to couple the lower address byte to the auxiliary bus 52. As before, the sequence control 484 will then shift the 8 bits contained in the lower 8 bit positions of the address counter 476 into the upper 8 bit positions thereof (processing block 536), make sure that the flag is reset (processing block 512), and generate the ready signal (processing block 498) to indicate to the CPU 12 that the lower address byte is available on the auxiliary bus 52.

In response to receiving a write (decision block 480) data (decision block 482) ROM access request, the sequence control 484 will simply perform the auto-incrementing procedure 500, before resetting the flag (processing block 512) and generating the ready signal (processing block 498) to indicate completion of the command. Thus, the write data command is a convenient method for resetting the flag, while accomplishing an auto-incrementing operation.

In the preferred mode of operation, the CPU 12 initially issues a write data command, to reset the flag. The CPU 12 then provides a selected starting address via two consecutive write address commands. Thereafter, the ROM 48 will automatically provide the processing information contained at sequentially higher address locations in response to each subsequent read data command issued by the CPU 12. As part of the auto-incrementing procedure 500 performed in response to each read data command, the ROM 48 leads the data latch 508 with the next sequential byte so that it will be available for rapid transfer to the CPU 12. Thus, the CPU 12 spends a minimal amount of time waiting for the data after a read data command is issued.

Although specific embodiments of the preferred form of the present invention have been described herein, variations may be made in the construction, arrangement or operation of the parts or elements of the various embodiments as disclosed herein without departing from the spirit and scope of the invention as defined in the following claims.

What is claimed is:

1. In a video display system for use with a raster-scanned video display unit, the system including:

a random access memory having stored therein a first ordered array of digital code elements which map a set of video color codes into the M columns of N rows of video display elements comprising a first video image; a second ordered array of digital code elements which map said set of video color codes into the S columns of T rows of video display elements comprising a second video image; and a third array containing a column displacement U and a row displacement V for the display of the second video image relative to the first video image, where $1 \leqq S \leqq M$, $1 \leqq T \leqq N$, $1 \leqq U \leqq M$ and $1 \leqq V \leqq N$;

a video display processor for providing a composite video signal for application to the video display unit, whereby the first video image may be displayed with the second video image superimposed thereon at said column and row displacements, the video display processor comprising:

sequence control means providing a cyclic column count X and a cyclic row count Y indicative of the time sequential position of the raster scan;

memory control means for selectively retrieving from the random access memory, portions of the first, second and third arrays;

overlay control means, cooperating with the memory control means in synchronization with the column and row counts, for providing a first pattern signal comprising the digital code element in the first array which maps the video display element in the column X of the row Y of the first video image when $1 \leqq X \leqq M$ and $1 \leqq Y \leqq N$, and for providing a second pattern signal comprising the digital code element in the second array which maps the video display element in the column $(X-U+1)$ of the row $(Y-B+1)$ of the second video image when $U \leqq X < (U+S)$ and $(V \leqq Y < (V+T)$;

priority selector means connected to the overlay control means for receiving the first and second pattern signals, selecting the second pattern signal in response to receiving the second pattern signal, selecting the first pattern signal when the second pattern signal is not selected, and providing a video control signal comprised of the video color codes mapped by the digital code elements comprising the selected pattern signal; and composite video generating means, cooperating with the priority selector means in synchronization with the column and row counts, for generating said composite video signal in accordance with the video color codes of the video control signal.

2. The video display processor of claim 1 wherein the overlay control means comprises:

preprocessing means, cooperating with the memory control means $1 \leqq X \leqq M$ and $1 \leqq (Y+1) \leqq N$, for retrieving the row displacement V, and for determining if the row count $(Y+1)$ is within a predetermined display range of said row displacement V;

processing means, cooperating with the memory control means when $1 \leqq X \leqq M$ and $1 \leqq Y \leqq N$, for retrieving and sequentially providing, as said first pattern signal, the digital code element in the first array which maps the video display element in the column X and row Y of the first video image;

postprocessing means, cooperating with the memory control means when $1 \leqq X \leqq M$ and $1 \leqq (Y+1) \leqq N$, for retrieving, in response to the preprocessing means determining that the row count $(Y+1)$ is within the predetermined display range of the row displacement V, the column displacement U and the digital code elements in the second array which map the S video display elements in the $(Y-V+1)$ row of the second video image; and means, cooperating with the post processing means, for sequentially providing, as the second pattern signal, the digital code element in the second array, retrieved by the postprocessing means, which maps the video display element in the $(X-U+1)$ column of the $(Y-V+1)$ row of the second video image, when $U \leqq X < (U+S)$ and $V \leqq Y < (V+T)$.

3. The video display processor of claims 1 or 2 wherein at least a first one of said video color codes corresponds to a video display element having a predetermined color and at least a second one of said video color codes corresponds to a video display element having no predetermined color, and wherein the priority selector means selects the received second pattern signal only when the digital code element comprising the received second pattern signal maps a video color code other than said second video color code.

4. The video display processor of claims 1 or 2 wherein the random access memory has stored therein a plurality of second ordered arrays or digital code elements which map said set of video color codes into the S columns of T rows of video display elements comprising respective second video images, and said third array contains a column displacement U and a row displacement V for the display of each of the second video images relative to the first video image; wherein the overlay control means provides a plurality of second pattern signals, each comprising the digital code element in a respective one of the second arrays which maps the video display element in the column $(X-U+1)$ of the row $(Y-V+1)$ of the respective second video image when $U \leqq X < (U+S)$ and $V \leqq Y < (V+T)$; and wherein the priority selector means selects a particular one of the received second pattern signals in accordance with a predetermined prioritized ordering of said second video images.

5. A method for simultaneously display on a raster-scanned video display unit, a first video image comprised of M columns of N rows of video display elements, with a second video image comprised of S columns of T rows of video display elements superimposed thereon beginning at a predetermined column displacement U and a predetermined row displacement V, where $1 \leqq S \leqq M$, $1 \leqq T \leqq N$, $1 \leqq U \leqq M$ and $1 \leqq V \leqq N$, the method comprising the steps of:

storing a first ordered array of digital code elements which map a set of video color codes into the M columns of N rows of video display elements comprising the first video image;

storing a second ordered array of digital code elements which map said set of video color codes into the S columns of T rows of video display elements comprising the second video image;

storing a third ordered array containing the column displacement U and row displacement V;

providing a cyclic column count X and a cyclic row count Y indicative of the time sequential position of the raster scan;

when $1 \leqq X \leqq M$ and $1 \leqq Y \leqq N$, providing a first pattern signal comprising the digital code element in the first array which maps the video display element in the column X of the row Y of the first video image;

when $U \leqq X < (U+S)$ and $V \leqq Y < (V+T)$, providing a second pattern signal comprising the digital code element in the second array which maps the video display element in the column $(X-U+1)$ of the row $(Y-V+1)$ of the second video image;

selecting the second pattern signal when the second pattern signal is provided;

selecting the first pattern signal when the second pattern signal is not selected;

providing a video control signal comprised of the video color codes mapped by the digital code elements comprising the selected pattern signal; and generating said composite video signal in accordance with the video color codes of the video control signal.

6. The method of claim 5 wherein the step of providing the second pattern signal further comprises the steps of;

when $1 \leqq X \leqq M$ and $1 \leqq (Y+1) \leqq N$, retrieving the row displacement V, and determining if the row count $(Y+1)$ is within a predetermined display range of said row displacement V;

when $1 \leq X \leq M$ and $1 \leq Y \leq N$, retrieving, in response to determining that the row count $(Y+1)$ is within the predetermined display range of the row displacement V, the column displacement U and the digital code elements in the second array which map the S video display elements in the $(Y-V+1)$ row of the second video image; and when $U \leq X < (U+S)$ and $V \leq Y < (V+T)$, sequentially providing, as the second pattern signal, the retrieved video display element in the second array which maps the video display element in the $(X-U+1)$ column of the $(Y-V+1)$ row of the second video image.

7. The method of claims 5 or 6 wherein at least a first one of said video color codes corresponds to a video display element having a predetermined color and at least a second one of said video color codes corresponds to a video display element having no predetermined color, and wherein the step of selecting the second pattern comprises selecting the received second pattern signal only when the digital code element comprising the received second pattern signal maps a video color code other than said second video color code.

8. The method of claims 5 or 6 wherein a plurality of the second video images, each comprised of S columns of T rows of video display elements, are superimposed on the first video image beginning at respective predetermined column displacements U and respective predetermined row displacements V; wherein the step of storing the second ordered array comprises storing said plurality of second ordered arrays; wherein the step of storing the third ordered array comprises storing a third ordered array containing each of the respective column displacements U and the respective row displacements V; wherein the step of providing the second pattern signal comprises providing a plurality of second pattern signals, each comprising the digital code element in a respective one of the second arrays which maps the video display element in the column $(X-U+1)$ of the row $(Y-V+1)$ of the respective second video image; and wherein the step of selecting the second pattern signal comprises selecting a particular one of the second pattern signals when at least one of said plurality of a second pattern signals is provided, in accordance with a prioritized ordering of said plurality of second video images.

* * * * *

UNITED STATES PATENT OFFICE
CERTIFICATE OF CORRECTION

Patent No. 4,243,984 Dated January 6, 1981

Inventor(s) David A. Ackley, Gerald D. Rogers, Peter H. Macourek, Karl M. Guttag, Ki Suk Chang It is certified that error appears in the above-identified patent and that said Letters Patent are hereby corrected as shown below:

Column 6, line 15, change "faster" to --raster--;
line 58, change "patter" to --pattern--.

Column 10, line 23, change "spriter" to --sprite--.

In the Claims
Claim 1, line 38, change "B" to --V--;
line 39, delete "(" (second occurrence).

Claim 2, line 4, after "means" insert --when--;
line 25, delete "," (second occurrence).

Signed and Sealed this

*First* Day of *November 1983*

[SEAL]

*Attest:*

GERALD J. MOSSINGHOFF

*Attesting Officer* *Commissioner of Patents and Trademarks*